(12) United States Patent
Davis

(10) Patent No.: US 10,252,423 B2
(45) Date of Patent: *Apr. 9, 2019

(54) CLEANING ROBOT FOR RECYCLING EQUIPMENT

(71) Applicant: CP Manufacturing, Inc., San Diego, CA (US)

(72) Inventor: Nicholas Davis, San Diego, CA (US)

(73) Assignee: CP MANUFACTURING, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/793,652

(22) Filed: Oct. 25, 2017

(65) Prior Publication Data
US 2018/0043538 A1 Feb. 15, 2018

Related U.S. Application Data

(63) Continuation of application No. 15/663,607, filed on Jul. 28, 2017, now Pat. No. 10,137,573.
(Continued)

(51) Int. Cl.
| | |
|---|---|
| *B26D 1/06* | (2006.01) |
| *B25J 9/16* | (2006.01) |
| *B25J 9/00* | (2006.01) |
| *B25J 5/04* | (2006.01) |
| *B25J 9/02* | (2006.01) |
| *B25J 11/00* | (2006.01) |

(Continued)

(52) U.S. Cl.
CPC .............. *B25J 9/1684* (2013.01); *B25J 5/04* (2013.01); *B25J 9/0009* (2013.01); *B25J 9/0084* (2013.01); *B25J 9/0093* (2013.01); *B25J 9/026* (2013.01); *B25J 9/1612* (2013.01); *B25J 11/00* (2013.01); *B26D 1/06* (2013.01); *B03B 9/06* (2013.01); *B26D 1/01* (2013.01); *Y10T 83/533* (2015.04)

(58) Field of Classification Search
CPC ............... B03B 9/06; B25J 9/026; B26D 1/06
USPC ........................................................ 209/487
See application file for complete search history.

(56) References Cited

U.S. PATENT DOCUMENTS

| | | |
|---|---|---|
| 2,335,164 A | 11/1943 | Wayland |
| 2,588,309 A | 3/1952 | Troyer |

(Continued)

OTHER PUBLICATIONS

International Search Report for PCT/US2017/044752 dated Oct. 12, 2017.

*Primary Examiner* — Kenneth E Peterson
(74) *Attorney, Agent, or Firm* — Manuel de la Cerra

(57) ABSTRACT

A self-cleaning apparatus for sorting a mixture of materials is disclosed that comprises a material sorter and a gantry positioning system elevated above the material sorter. The gantry positioning system includes a longitudinal travel rail with a longitudinal travel rail carriage, a traverse travel rail connected to the longitudinal travel rail carriage running perpendicular to the longitudinal travel rail, with a traverse travel rail carriage, and a vertical travel rail connected to the vertical travel rail carriage running perpendicular to the traverse travel rail. A cutter and optionally, a picker, are connected to the vertical travel rail. The gantry positioning system can move the cutter and picker various directions to dislodge and remove material that may have accumulated on the sorter. Instead of a gantry positioning system, the apparatus may have a multi-axis arm.

8 Claims, 22 Drawing Sheets

Related U.S. Application Data

(60) Provisional application No. 62/380,886, filed on Aug. 29, 2016, provisional application No. 62/373,268, filed on Aug. 10, 2016.

(51) Int. Cl.
*B03B 9/06* (2006.01)
*B26D 1/01* (2006.01)

(56) References Cited

U.S. PATENT DOCUMENTS

| | | | | |
|---|---|---|---|---|
| 3,145,937 | A | * | 8/1964 | Scovel ................ B03B 9/06 209/616 |
| 4,998,442 | A | | 3/1991 | Brown |
| 5,407,415 | A | * | 4/1995 | Spishak ............ G05B 19/4182 219/121.82 |
| 5,960,964 | A | | 10/1999 | Austin |
| 6,124,560 | A | * | 9/2000 | Roos ................ B07B 13/00 209/578 |
| 2011/0000171 | A1 | * | 1/2011 | Daughtry ............ B26D 1/0006 53/492 |
| 2011/0017030 | A1 | | 1/2011 | Chambers |
| 2014/0202296 | A1 | * | 7/2014 | Forlong ............ B23Q 11/0075 83/100 |
| 2016/0001296 | A1 | * | 1/2016 | Scaife ................ B02C 13/06 241/24.1 |

\* cited by examiner

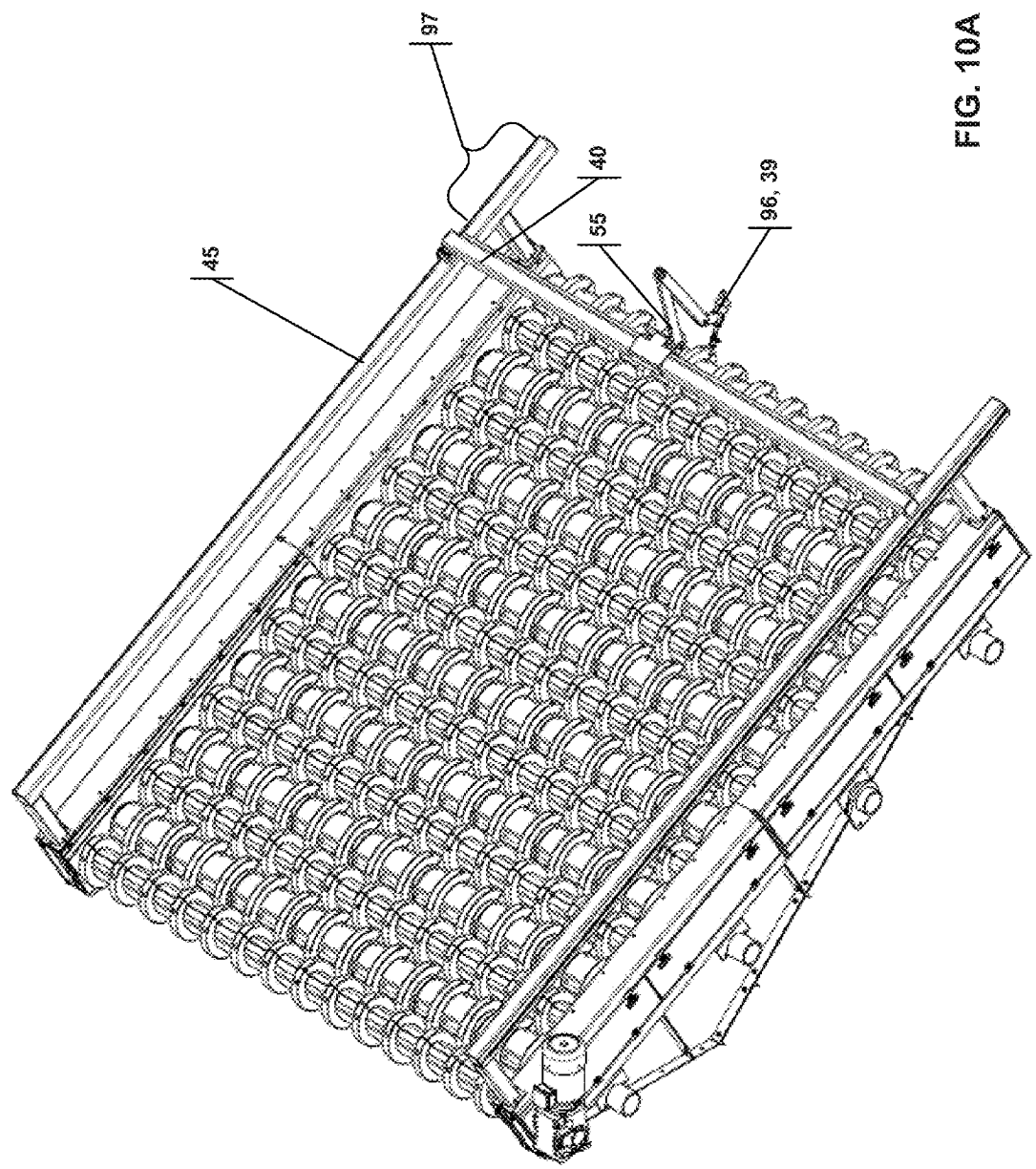

CLEANING ROBOT FOR RECYCLING EQUIPMENT

RELATED APPLICATIONS

This application claims priority as a continuation of U.S. patent application Ser. No. 15/663,607 filed on Jul. 28, 2017, now U.S. Pat. No. 10,137,573, which claims priority to U.S. Patent Application 62/373,268 filed on Aug. 10, 2016, and U.S. Patent Application 62/380,886 filed on Aug. 29, 2016. All of these applications are assigned to the same assignee and have a common inventor with the present application. All of these applications are incorporated herein by reference.

TECHNICAL FIELD

The present invention relates generally to machines used to sort materials and mixed recyclable materials.

BACKGROUND

Solid waste separation equipment faces many maintenance hazards. The single biggest issue is that solid waste tends to contain long, thin, flexible items, such as ropes, cords, cables, linens, and plastic film that can wrap around any rotating shaft exposed to the material stream. These "wrapping hazards" will also drape over any exposed surfaces, jam up air systems, wrap on head pulleys, drape on exposed cross members, plug screen holes in trommels or vibratory screens, and cause other problems to solid waste processing equipment, making maintenance necessary. Disc screens, which are composed of a series of rotating shafts used to screen material by size or shape, are particularly prone to wrapping and jamming on these materials. As machines wrap more, separation efficiency goes down, parts wear out faster, and jamming hazard increases. Thus, disc screens must be frequently cleaned.

Under the current art, any wrapped material on a screen currently requires manual cleaning, involving shutting down the entire material sorting system, de-energizing the entire system, and then locking out the equipment being cleaned. After the system is de-energized and locked out, people have to enter a confined space, tie off to protect against falls, and then manually climb over a difficult terrain to cut off wrappings. The whole process can take hours of labor for multiple people in a large solid waste separation facility, and involves many safety hazards. In addition to safety and performance degradation considerations, cleaning expenses on a large material sorting system may amount to over $200,000 a year, plus workers' compensation.

Thus there is a need in the art for a sorting apparatus which addresses the above issues. Provided herein is a robotic cleaner that would be a significant improvement in a solid waste separation facility as it would save labor, make the system safer, decrease downtime associated with de-energizing the system, and improve system performance.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The apparatus, systems, and methods described herein elegantly solve the problems presented above. A self-cleaning apparatus for sorting a mixture of materials is disclosed that comprises a material sorter and a gantry positioning system elevated above the material sorter. Other positioning systems may also be used, for example a multi-axis robotic arm. The gantry positioning system includes a longitudinal travel rail with a longitudinal travel rail carriage, a traverse travel rail connected to the longitudinal travel rail carriage running perpendicular to the longitudinal travel rail, with a traverse travel rail carriage, and a vertical travel rail connected to the vertical travel rail carriage running perpendicular to the traverse travel rail. A cutter and optionally picker are connected to the vertical travel rail. The gantry positioning system can move the cutter and picker various directions to dislodge and remove material that may have accumulated on the sorter. The gantry positioning system is constructed to move the cutter and picker in one or more of the following directions: parallel to the direction of the longitudinal travel rail; parallel to the direction of the traverse travel rail; and/or parallel to the direction of the traverse travel rail.

In certain embodiments, a sensor such as a camera for detecting a location where material has accumulated on the material sorter may also be used. The sensor, along with the gantry positioning system, the cutter and the picker, may be connected to a processor that: (a) locates the location where material has accumulated on the material sorter; (b) directs the positioning system to position the cutter adjacent to the location; (c) actuates the cutter to dislodge the accumulation from the material sorter; (d) directs the gantry positioning system to position the picker adjacent to the location; and (e) actuates the picker to remove the accumulation from the material sorter.

In yet other embodiments, the cutter comprises a clipper, saw, waterjet, scissor-like cutter, knife, bolt cutter, air chisel, metal cutting wheel, ultrasonic knife or, laser. The picker comprises a hook, a scissor-type gripper or a vacuum. The material sorter may be a disc screen or a trommel. Instead of a gantry positioning system, the apparatus may have a multi-axis arm In other embodiments, the traverse travel rail may further include a second traverse travel rail carriage and the vertical travel rail includes a second vertical travel rail connected to the second vertical travel rail carriage running perpendicular to the traverse travel rail, and the picker is connected to the second vertical rail.

The apparatus may also employ a rotatable cutter/picker head that is connected to the vertical travel rail, and the cutter and picker are then connected to head. Methods to rank accumulations are also disclosed, as is a method to determine the rotational position of the sorting apparatus to better cut and dislodge accumulations.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

FIG. 10A is an isometric view of a third embodiment comprising a multi-axis arm traveling on a gantry system.

DETAILED DESCRIPTION OF EXAMPLE EMBODIMENTS

Figure 1:
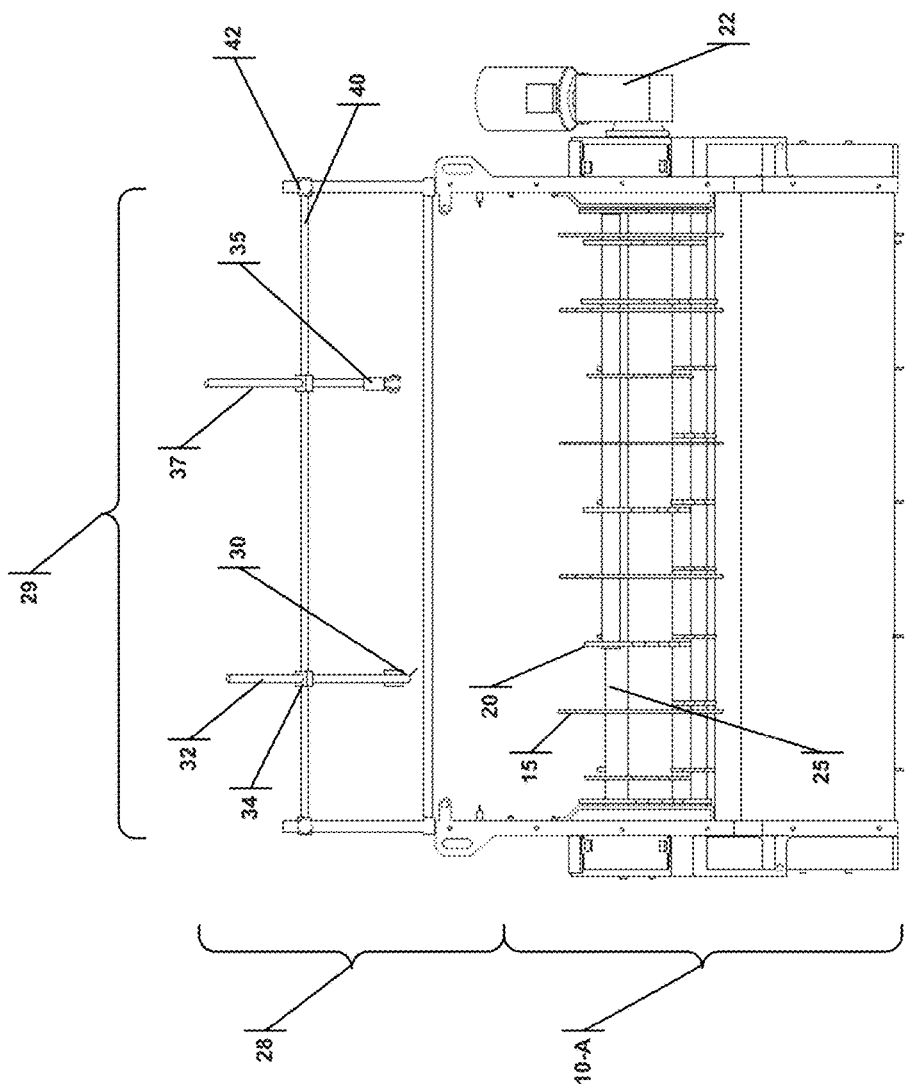
FIG. 1 is a front view of a first embodiment of a robotic arm to clean wrapping materials.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-17 and is provided for ease of reference, where like reference numerals designate corresponding features throughout the specification and figures:

Disc Screen 10A
Disc Screen 10B
Major Disc 15
Minor Disc 20
Disc Screen Motor 22
Hub/rotor 25
Material travel direction 26
Robot Cutter 28
Gantry Positioning System 29
Cutter 30
Light 31
Cutter Vertical Travel Rail 32
Traverse Travel Rail Carriage 34
Picker 35
Picker Vertical Travel Rail 37
Inspection Camera 39 (could be on cutter, picker or robotic arm)
Traverse Travel Rail 40
Sorting Surface 41
Longitudinal Travel Rail Carriage 42
Longitudinal Travel Rail 45
Rotatable Cutter/Picker Head 46
Wrapping Debris 50
Multi-axis Cutter 55
Inspection Camera 57
Cutter Longitudinal Rail 60
Multi-axis Picker Arm 65
Picker Longitudinal Rail 70

Static Inspection Camera 72
Perforated Trommel 80
Hole 85
Elevated perforation 90
Processor 95
Waterjet Cutter 96
Longitudinal rail extended portion 97
Method for operating the arm system 100
Steps to the method 100 101-130
Steps to method 200 205-260
Rotational detection feature (divot) 300
Hub/rotor 305
Distance observe by camera/sensor 310
Camera/sensor 315
Reinforcement 330
Steps to method 400 405-425

Referring to FIG. 1, the self-cleaning material sorter system has a robot cutter 28 that may be positioned or installed on top of a waste material sorting system, so that the disc screen 10-A is beneath the robot cutter 28 and the gantry positioning system 29. The disc screen 10-A may function by the rotation of a hub/rotor 25 or a shaft connected to the disc screen motor 22, which when operated may allow a major disc 15 and/or a minor disc 20 to rotate and therefore agitate the material being sorted so that the material can fall through the spacing between the discs and the hub/rotor 25 or shaft assembly. The hub/rotor 25 may have a number of major discs and minor discs, and the disc screen motor 22 may turn more than one hub/rotor 25. The robot cutter 28 is fitted with a gantry positioning system 29 that can help the robot cutter 28 precisely cut and dislodge the material wrapping or jamming the disc screen 10-A. Instead of disc screens, the self-cleaning material sorter system may be comprised of trommels, which will be described in conjunction with FIG. 11.

Figure 16:
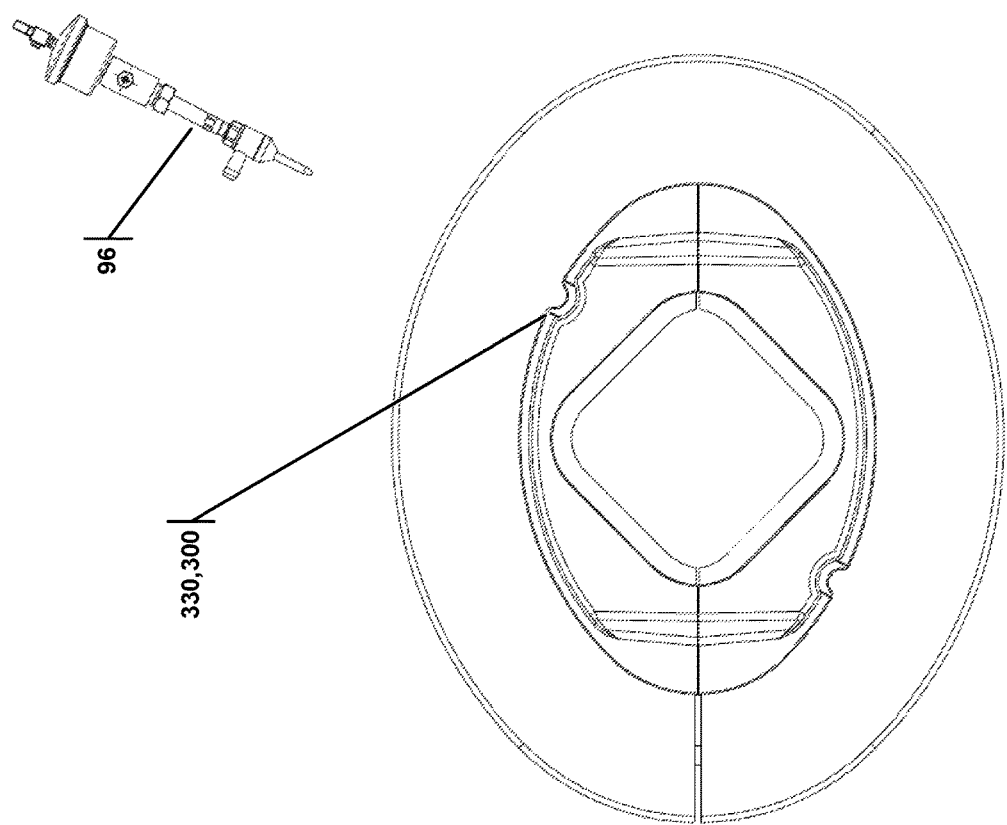
FIG. 16 illustrates a hub/rotor with reinforcement for optimizing cutting with a waterjet.

The robot cutter 28 in FIG. 1 features a cutter 30 and a picker 35. The cutter 30 is used to cut and/or dislodge the accumulated material, such as wedge shaped debris that has jammed the disc screen 10-A or stringy debris that has wrapped around a part of the disc screen 10-A. The cutter 30 may feature a clipper, a mechanical saw, a waterjet, scissor-like cutter, knife, bolt cutter, air chisel, metal cutting wheel, ultrasonic knife, a laser, or another device that may be used to cut through and/or dislodge the accumulated wrapping material. It should be noted that in practice, most wrapping occurs on the hub/rotor rather than on the discs. The hub/rotor can be designed with an elevated ridge or a slot co axial to the hub/rotor, which allows a cutter or scissor device to get under and initiate a cut on tightly wrapped materials. (see. FIG. 16) Most gantry-positioning systems and robot arms have less manual dexterity than a person, and so such a specially-designed hub/rotor would promote better functionality.

The preferred type of cutter is dependent on the opening size of the disc screen, the location in the system, and the material of the discs. For example, a knife works best for cutting off small openings of metal discs, like the VHS tape wrap. Although a picker is described below is a preferred embodiment, it is not necessary. For example, in some sorting apparatus, the disc screens can have a reverse-direction conveyor for trash. So if wrappings were cut off the screen and dropped on the reverse-conveyor, that would remove the wrapping. It is also possible to simply cut the wrapped material and allow it to run through the system. Although it may wrap again, it can be cut again such that the wrapped material eventually exits the system.

Afterward, an optional picker 35 may be used to pick up and remove the accumulated material, and prevent it from wrapping or jamming the machine again on the next screen. The picker 35, which may feature a hook, a scissor-type gripper, or vacuum, can grab the dislodged wrapping material and drop it in a chute, air duct, or another device to remove it entirely from the material sorting system.

The gantry positioning system 29 is generally comprised of a series of travel rails and rail carriages. The gantry positioning system 29 pictured in FIGS. 1-7 is illustrated as having a pair of longitudinal travel rails 45, a traverse travel rail 40, and a cutter vertical travel rail 32 as well as a picker vertical travel rail 37. It should be understood that there are alternative multi-axis gantry positioning systems well known in the art that can substitute for the particular gantry positioning system 29 illustrated in FIGS. 1-7, and that alternative gantry positioning systems do not depart from the scope and spirit of the present invention.

As is shown in FIG. 1, both the cutter 30 and the picker 35 are connected to the traverse travel rail 40 via a traverse travel rail carriage 34. For each robot arm, there is also a vertical travel rail carriage that is perpendicular to the traverse travel rail carriage 45. For simplicity of representation, in FIGS. 1-7 the vertical travel rail carriage is attached perpendicularly to the traverse travel rail carriage 34 and may appear to be the same piece (see FIG. 4 and FIG. 5). The cutter vertical travel rail 32 and its travel rail carriage enable the cutter 30 to be raised or lowered with respect to the discs on the hub/rotor 25 of the disc screen 10-A. Similarly, the picker vertical travel rail 37 and its travel rail carriage enables the picker 35 to be raised or lowered relative to the hub/rotor 25 of the disc screen 10-A, parallel to the vertical travel rails. The traverse travel rail carriage 34 for each robot arm enables that arm to travel in the traverse direction parallel to the traverse travel rail 40. The travel rails may be, by non-limiting example, of a rack and pinion construction.

Figure 2:
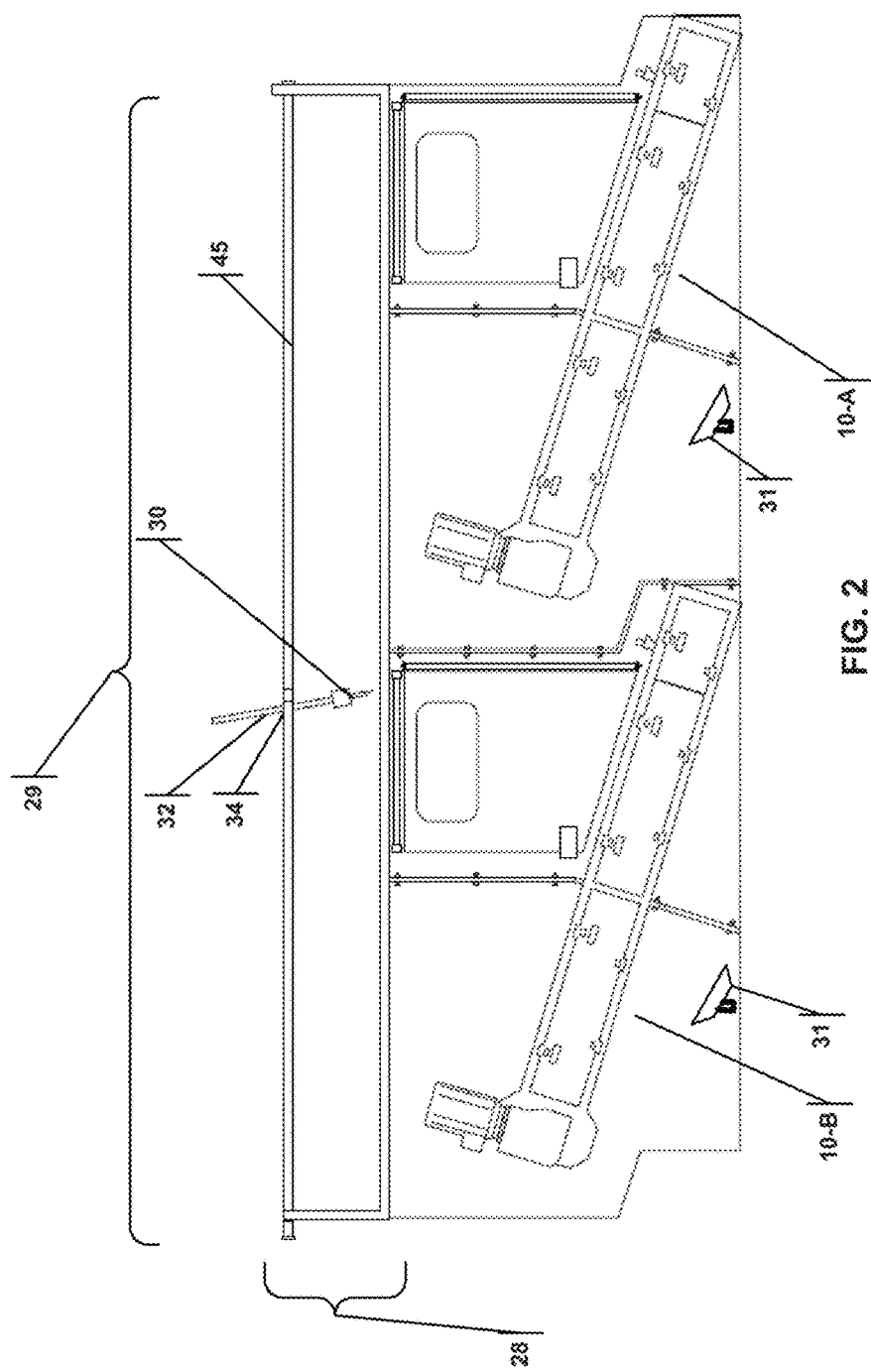
FIG. 2 is a side view of the first embodiment of a robotic arm to clean wrapping materials.
Figure 3:
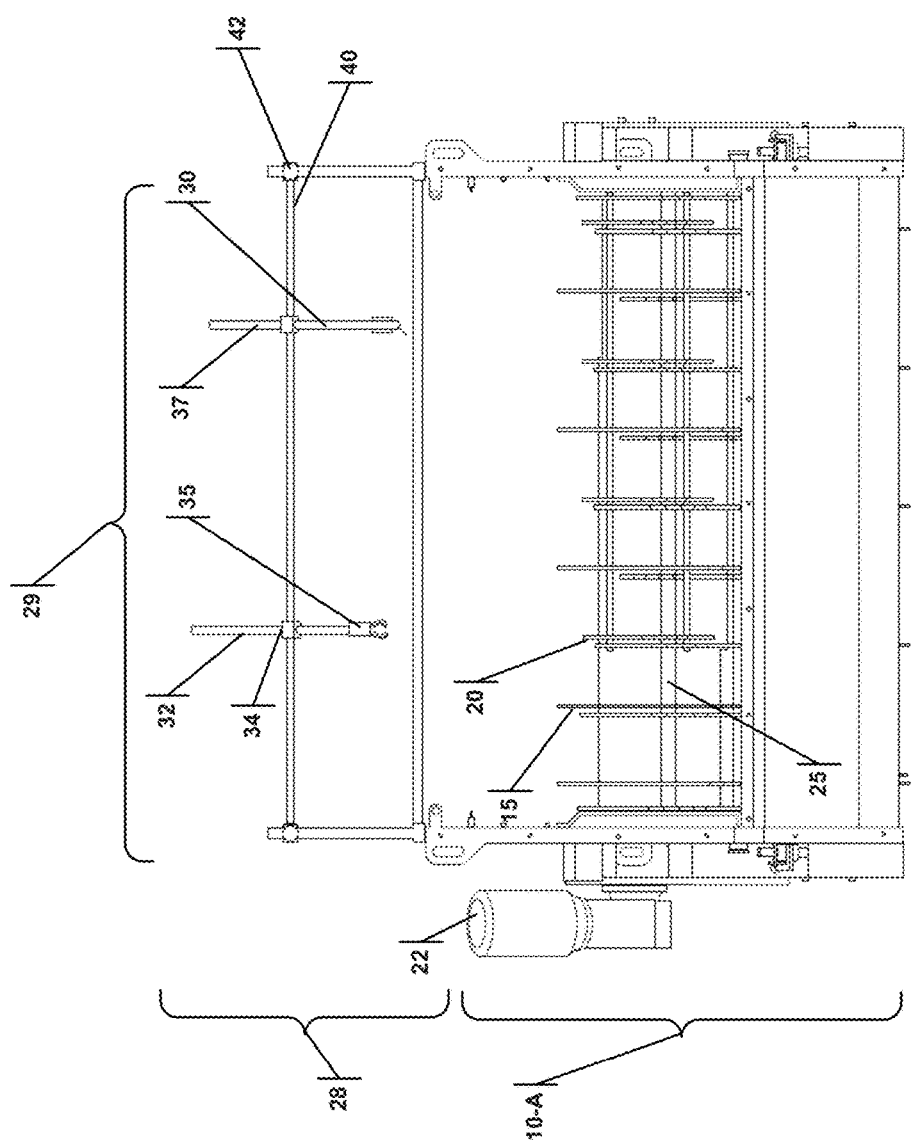
FIG. 3 is a back view of the first embodiment of a robotic arm to clean wrapping materials.

FIG. 2, a side view of the self-cleaning material sorter system, shows the longitudinal travel rail 45 instead of the traverse travel rail 40. FIG. 2 also shows more than one disc screen; both disc screens 10-A and 10-B may be accessed by the robot cutter 28. To get from one disc screen to another, the robot cutter 28 may use the gantry positioning system 29 to move the cutter 30 in the longitudinal direction parallel to the longitudinal travel rail 45. FIG. 3, a back view of the system, is included here for completeness. It can be seen that the robot cutter 28 and gantry positioning system 29 are located on top of the disc screen 10-A. The traverse travel rail carriages 34 allow the picker 35 and the cutter 30 to move along the traverse travel rail 40, whereas the longitudinal travel rail carriage 42 allows the entire traverse travel rail 40, as well as the robot arms connected to the traverse travel rail 40, to move in the longitudinal direction as suggested by FIG. 2. This is further illustrated by FIGS. 4 and 5.

Figure 4:
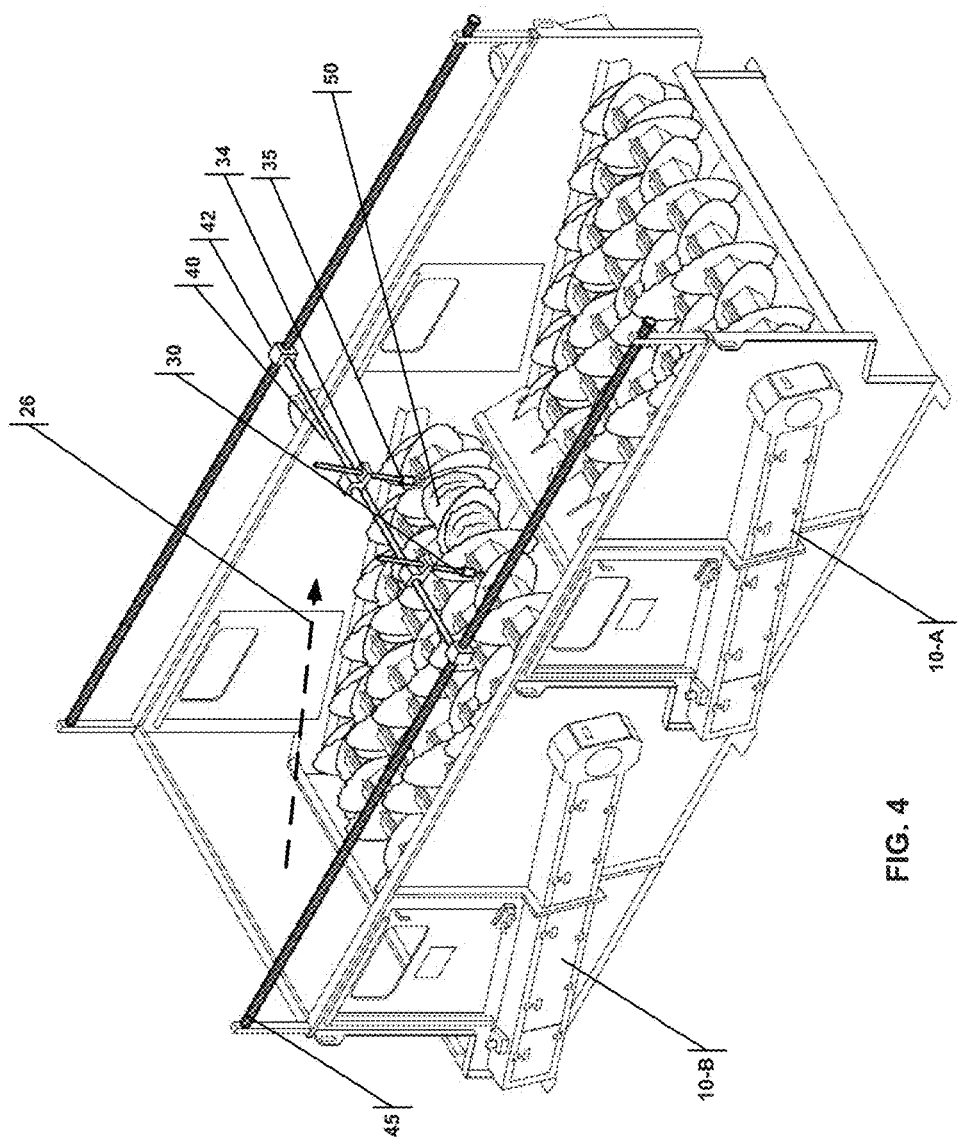
FIG. 4 is an isometric view of the first embodiment of a robotic arm to clean wrapping materials.

In FIG. 4, the material travels up the disc screen 10-B along the arrow direction 26. The cutter 30, picker 35, and the traverse travel rail 40 are positioned on top of the disc screen 10B. The debris 50 wrapping around the hub/rotor 25 is at the end of the disc screen 10B. First the cutter 30 would be used to dislodge the wrapping debris 50, by using a clipper, mechanical saw, waterjet, laser, or another such technique to cut and dislodge the wrapping debris 50. Then the picker 35 would be used to pick up the wrapping debris 50 and remove it from the disc screen 10-B. The picker 35 in FIG. 4 is picking up the wrapping debris 50.

Figure 5:
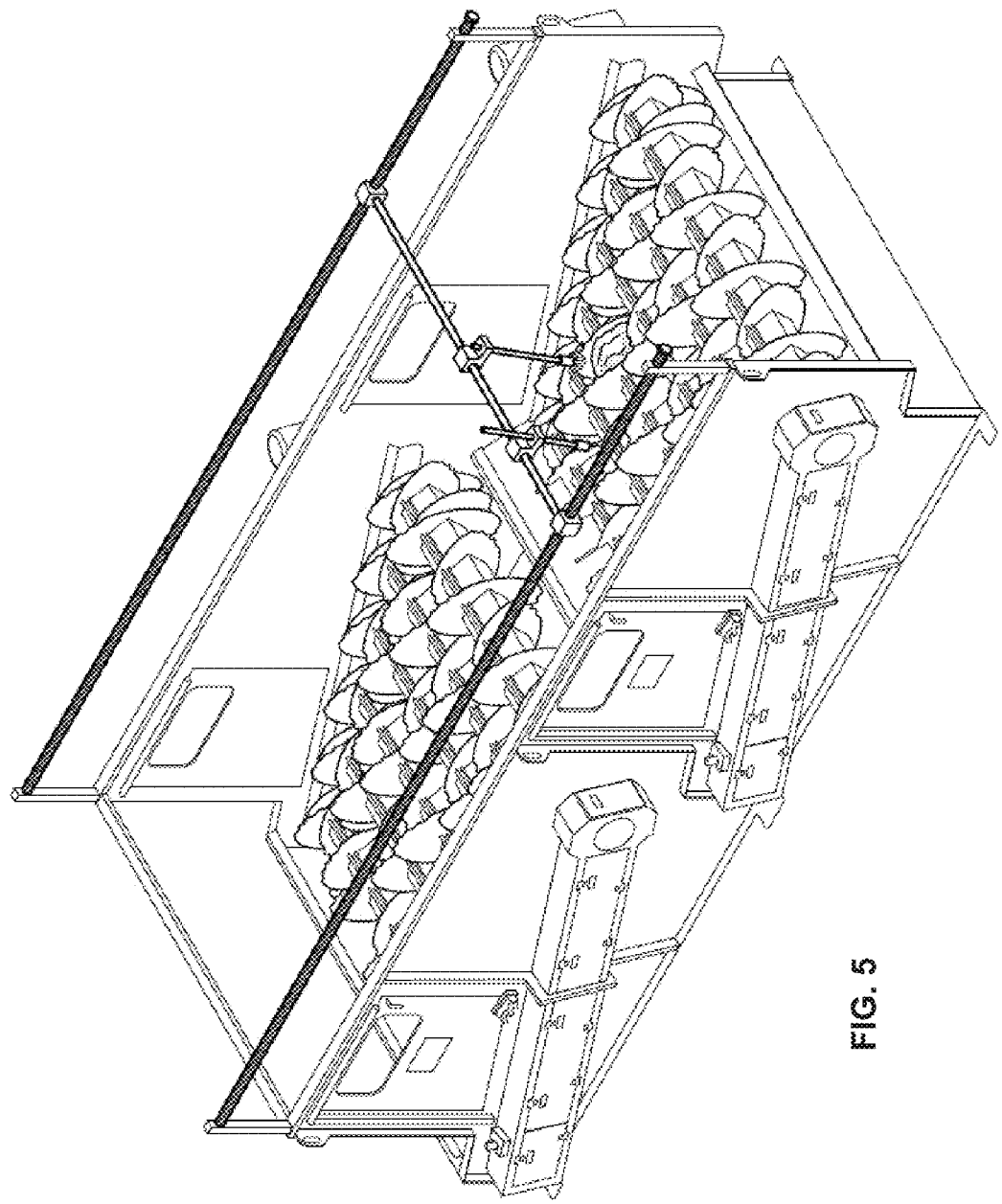
FIG. 5 is an isometric view of the first embodiment of a robotic arm to clean wrapping materials, where the robotic arms have traveled along the longitudinal rail of the gantry positing system as compared to the position in FIG. 4.

In FIG. 5, the disc screen 10-B is now free of wrapping debris, and the robot arms 30 and 35 have traveled in the longitudinal direction along the longitudinal travel rail 45 to get at the wrapping debris 50 on the disc screen 10-A.

Figure 6:
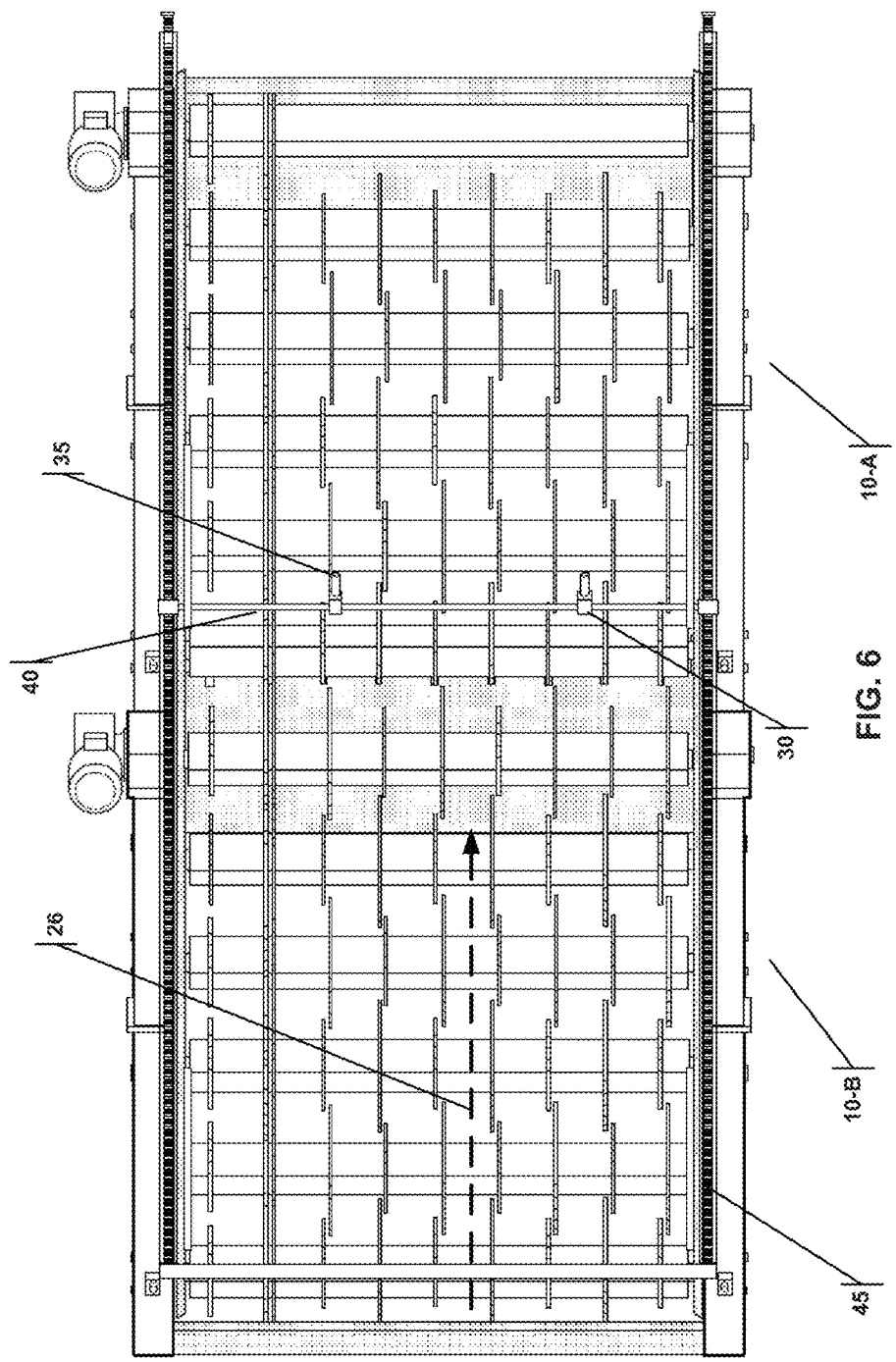
FIG. 6 is a top view of the first embodiment of a robotic arm to clean wrapping materials.

FIG. 6 shows a top view of the robot picker system. Two disc screens, 10-A and 10-B, are featured, and the cutter 30 and picker 35 are connected to the traverse travel rail 40. This robot cutter assembly could move onto multiple screens through the gantry positioning system, and one or more robot cutter assemblies may be used per self-cleaning material sorter machine.

Figure 7:
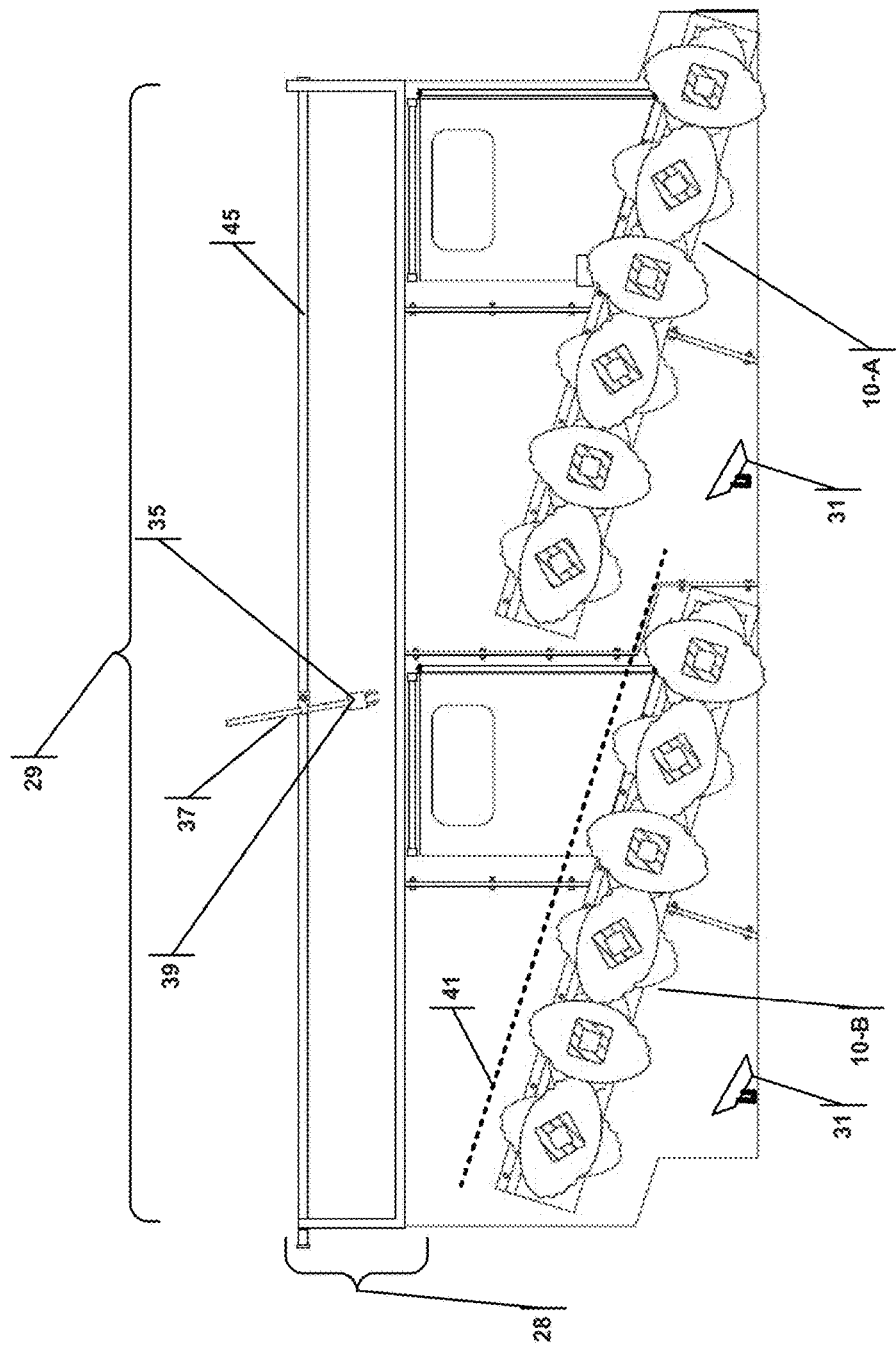
FIG. 7 is a cross sectional side view of the first embodiment of a robotic arm to clean wrapping materials.

A camera and/or a sensor system may be mounted in or on one or both robotic cutter/picker, or independently above the sorting apparatus, to detect where debris has jammed, wrapped, or draped on a disc screen. As illustrated in FIG. 7, the picker 35 may have an inspection camera 39 or some equivalent sensor mounted either on the head of the picker 35 or on the vertical travel rail 37 of the picker 35. Alternatively, the inspection camera 39 may be located on the cutter 30 or onto a frame that spans the screening area. A light 31 may be used to illuminate disc screen sorter, and advantageously may be placed on the opposite side of the sorting surface 41 as the camera 39 so that the camera can better detect wrapping/accumulation. This is described further below. The self-cleaning material sorter system would have a processor that operates the gantry positioning system, the robotic arm, cutter, picker and/or the camera or sensor. Optionally, the self-cleaning material sorter system could also run the disc screen motor 22 both forwards and in reverse, so that the disc screens could move in coordination with the picker 35 to assist in removing the wrapping debris 50.

Figure 8C:
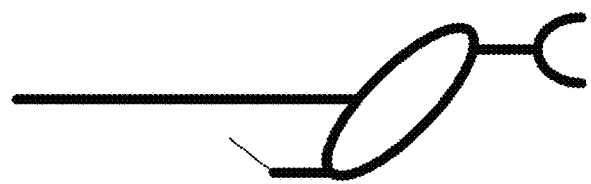
FIG. 8C illustrates a cutter vertical travel rail with a rotatable cutter/picker head, positioned with the picker in the operable state.
Figure 8B:
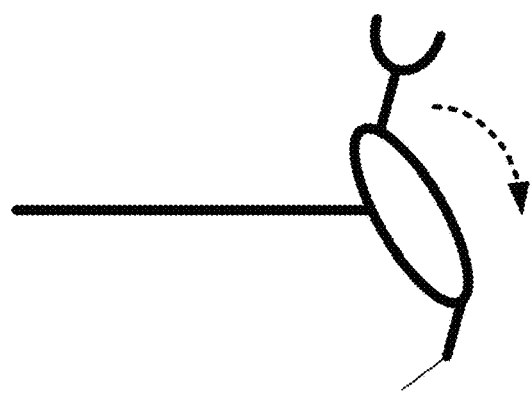
FIG. 8B illustrates a cutter vertical travel rail with a rotatable cutter/picker head, transitioning to a position with the picker in the operable state.
Figure 8A:
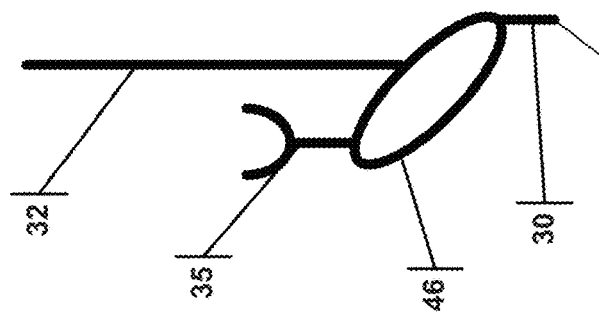
FIG. 8A illustrates a cutter vertical travel rail with a rotatable cutter/picker head, positioned with the cutter in the operable state.

FIGS. 8A through 8C conceptually illustrate a rotatable cutter/picker head 46, which may be used with a single vertical travel rail 32 instead of both the vertical travel rails 32 and 37 as shown in FIGS. 1-7. Both the cutter 30 and picker 35 are connected to the rotatable cutter/picker head 46. In one configuration, the cutter operable state shown in FIG. 8A, the cutter 30 faces downward to be operable to interact with the disc screen or trommel, positioned in a direction substantially parallel to the vertical travel rail 32. In the cutter operable state, the picker 35 faces upward in a direction substantially parallel to the vertical travel rail 32 and is positioned some distance above the cutter 30. As the cutter/picker head 46 is actuated to rotate, it may be in a transitional configuration shown by FIG. 8B. As the cutter/picker head 46 continues to rotate, it reaches a picker operable state illustrated in FIG. 8C. In the picker operable configuration, the picker 35 faces downward in a direction substantially parallel to the vertical travel rail 32 to be able to interact with the disc screen or trommel, while the cutter 30 faces upward in a direction substantially parallel to the vertical travel rail 32, positioned some distance above the picker 35.

Embodiments of the present invention may operate a rotatable cutter/picker head 46 either with a gantry position system 29, or with a multi-axis robot arm. Other variations may feature separate multi-axis cutter and picker each operating on its own longitudinal rail, or a multi-axis arm on a rail mounted to the side of the sorting apparatus.

Figure 9:
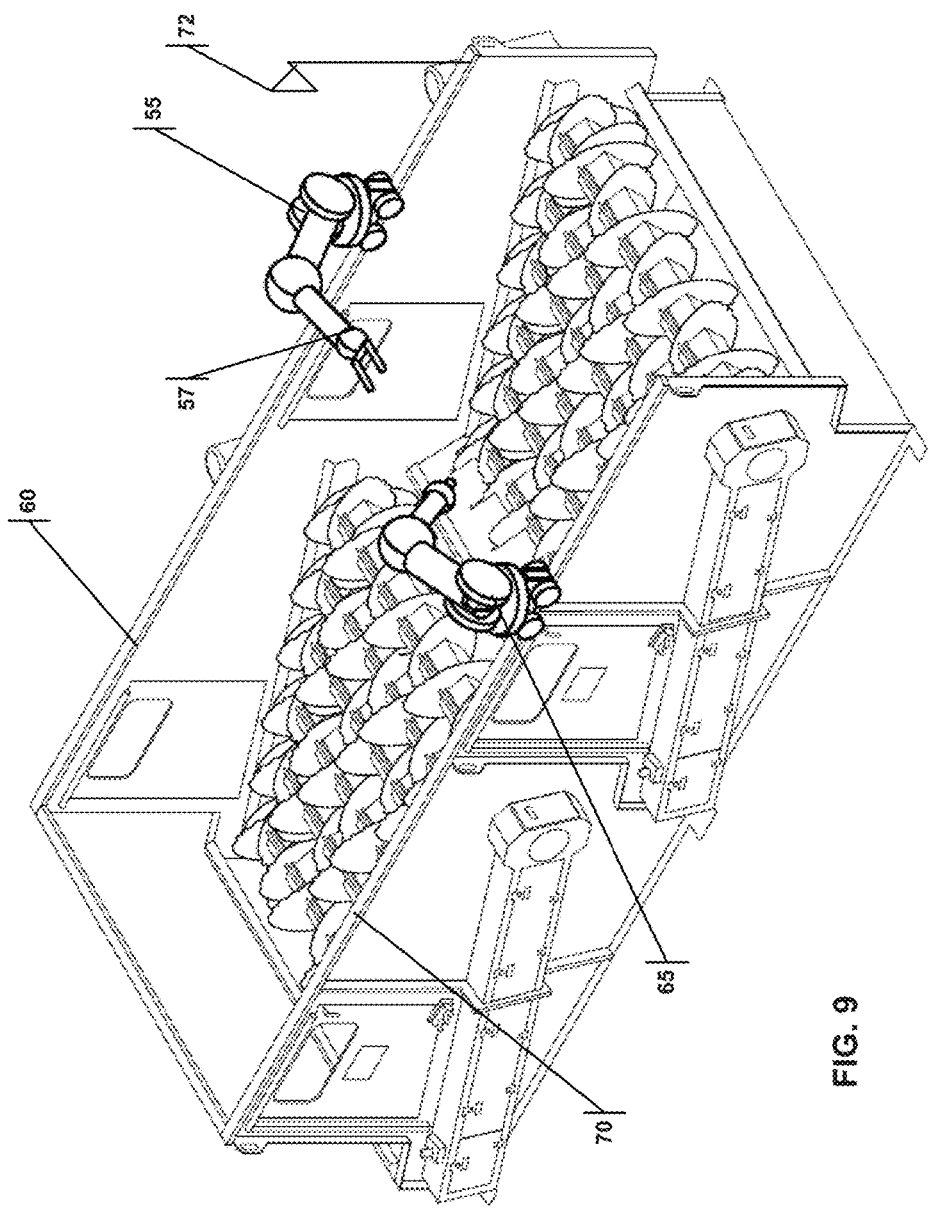
FIG. 9 is an isometric view of a second embodiment of a robotic arm to clean wrapping materials.

FIG. 9 shows an isometric view of an embodiment where there are two longitudinal rails and two multi-axis arms. The multi-axis arm (cutter) 55 can travel longitudinally, parallel to the cutter longitudinal rail 60. There is likewise a picker longitudinal rail 70, and the multi-axis arm (picker) 65 may travel parallel to the picker longitudinal rail 70. Either, both, or neither multi-axis robot arm may be mounted with an inspection camera 57 to detect any wrap or jam in the disc screen(s). Optionally, the system may make use of a static inspection camera 72 mounted at a specific location above the disc screens. As another alternative, instead of disc screens the embodiment may use trommel screens.

Figure 10B:
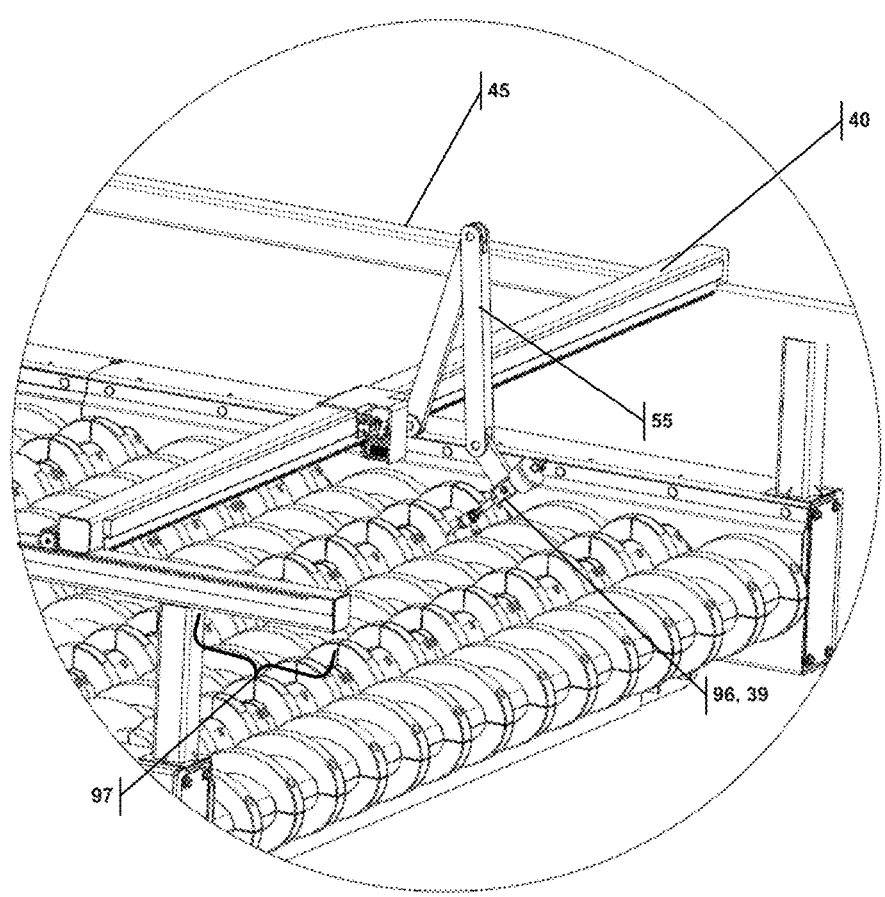
FIG. 10B is an isometric enlarged view of the multi-axis arm of the third embodiment.
Figure 10C:
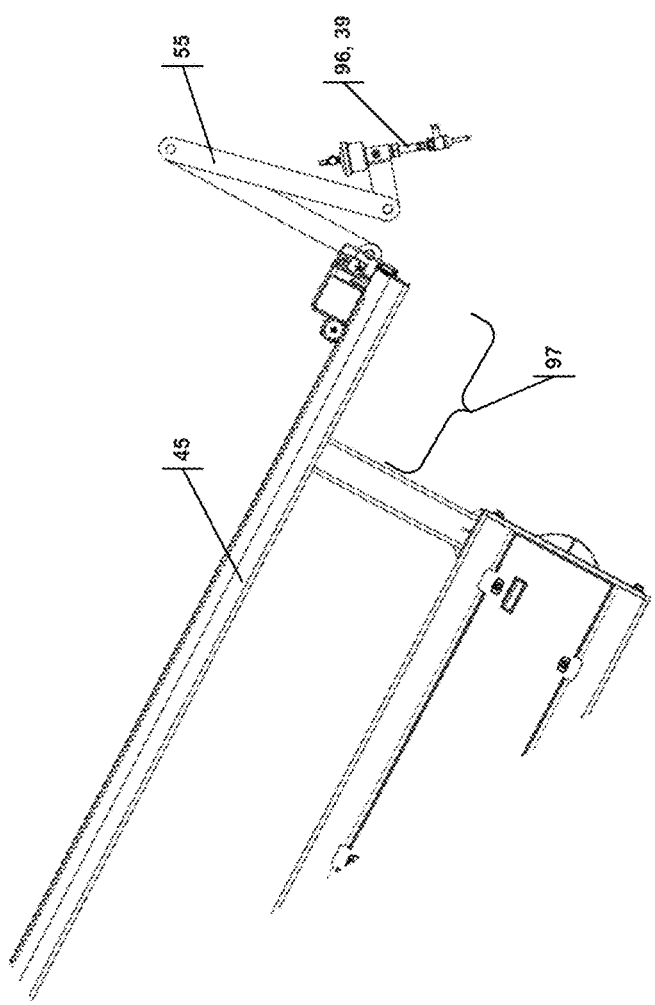
FIG. 10C is a side enlarged view of the multi-axis arm of the third embodiment.
Figure 10D:
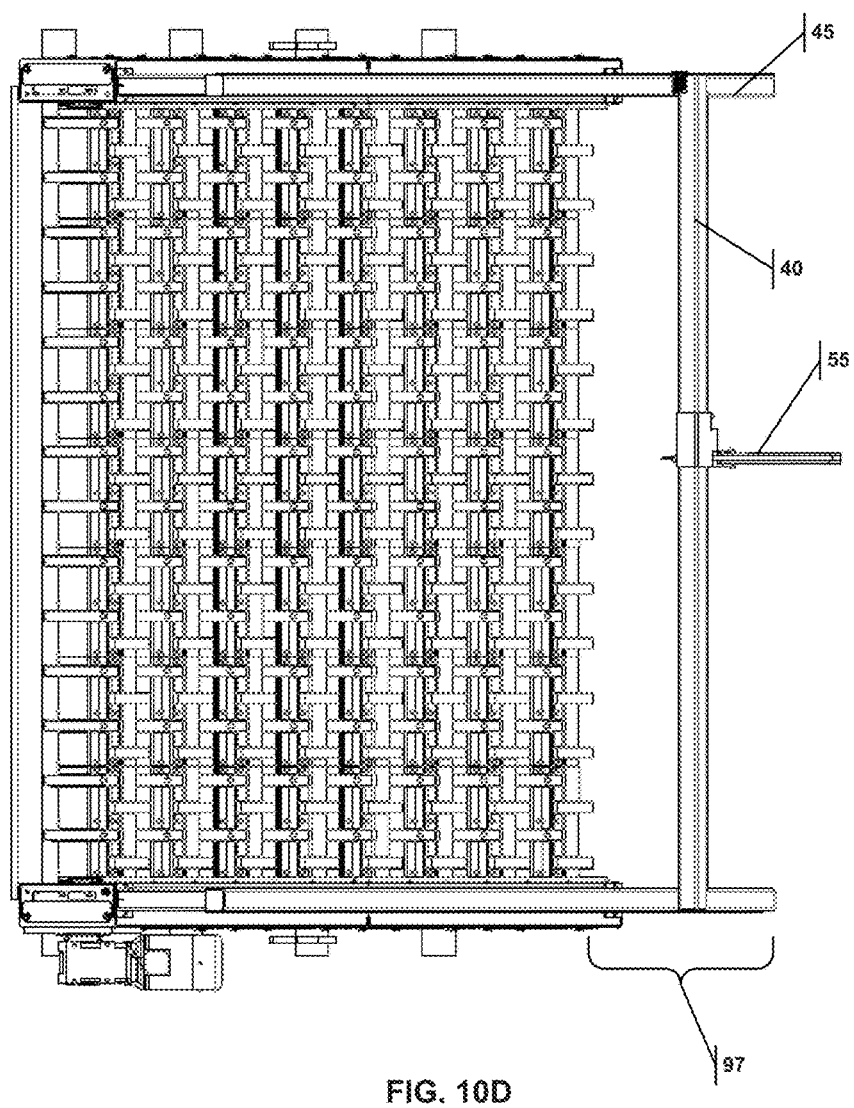
FIG. 10D is a top view of the third embodiment comprising a multi-axis arm traveling on a gantry system.
Figure 10E:
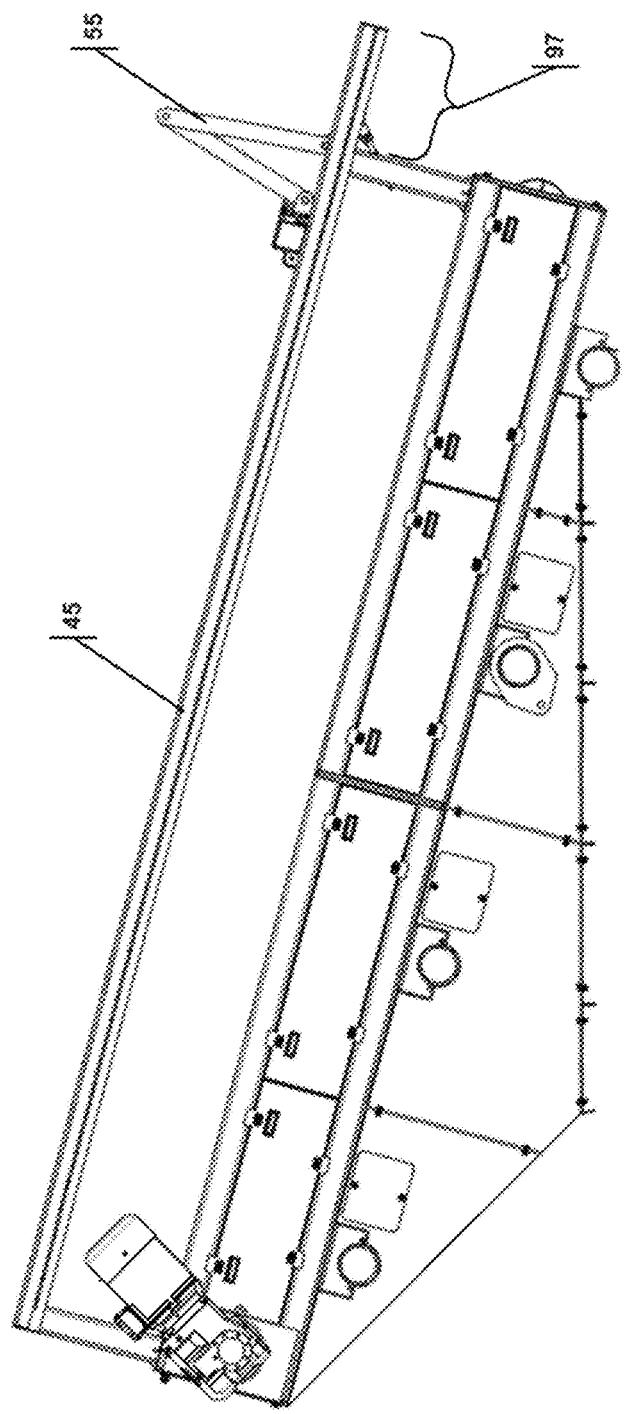
FIG. 10E is a side view of the third embodiment comprising a multi-axis arm traveling on a gantry system.
Figure 10F:
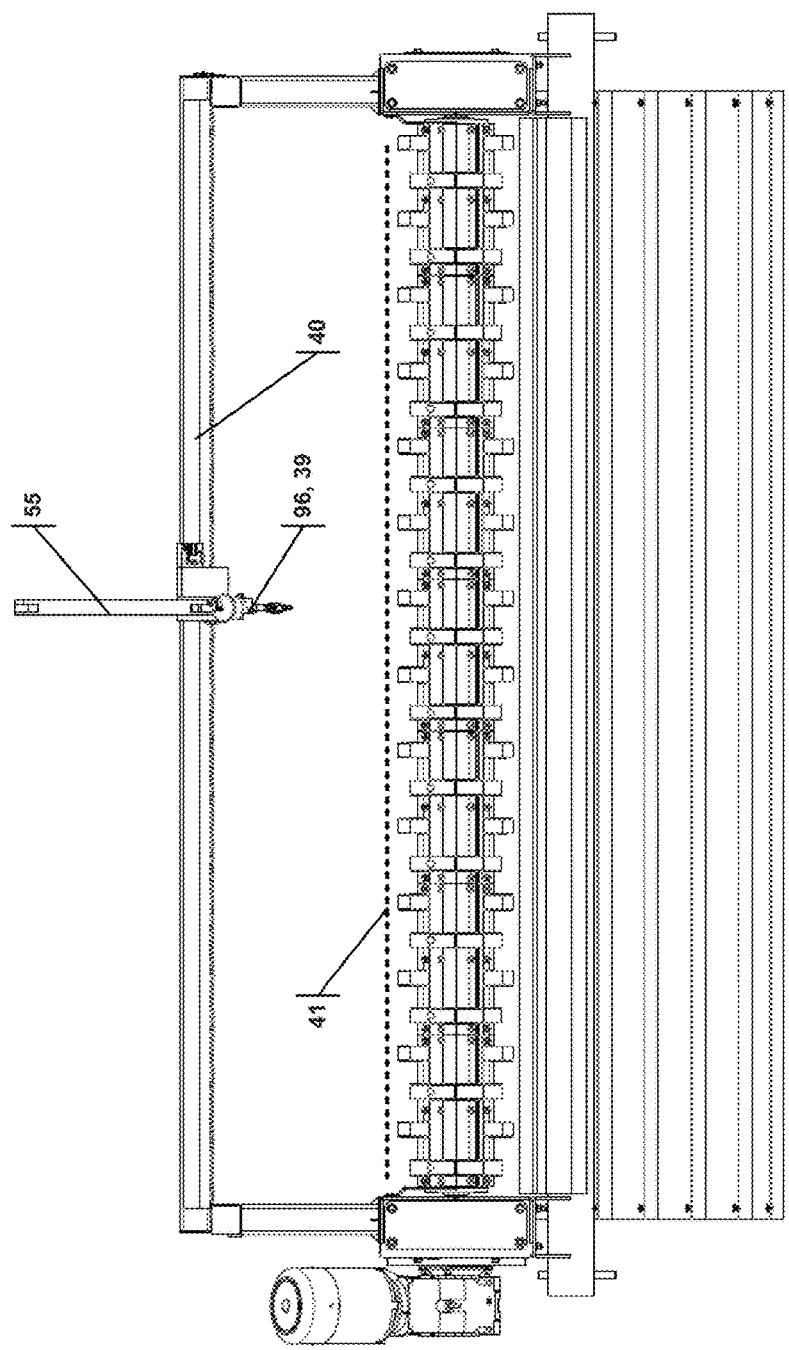
FIG. 10F is front view of the third embodiment comprising a multi-axis arm traveling on a gantry system.

FIGS. 10A-10E illustrate another embodiment that has many of the same features of the multi-axis arm of FIG. 9, but further includes a full longitudinal and traverse gantry rail system (45 and 40) with rack and pinion drive. The cutter shown is a waterjet. This embodiment provides the speed and torque required to move the heavy multi-axis arm 55. The cutter shown is a jet 96 and also a camera 39. The multi-axis arm 55 may have three knuckle joints with about 270 degrees of rotation each. While this results in an over-defined 5 axis arm, it also avoids any rotational or theta joints and retracts the cutting system as far away from the sorting surface 41 of the sorting machine as possible as shown in FIG. 10C. To further remove the arm from sorting surface 41 of the sorting machine and away from bouncing debris, the longitudinal rails may have an extended portion 97 that extended beyond the sorting machine surface, as shown in FIGS. 10A through 10E.

Figure 11:
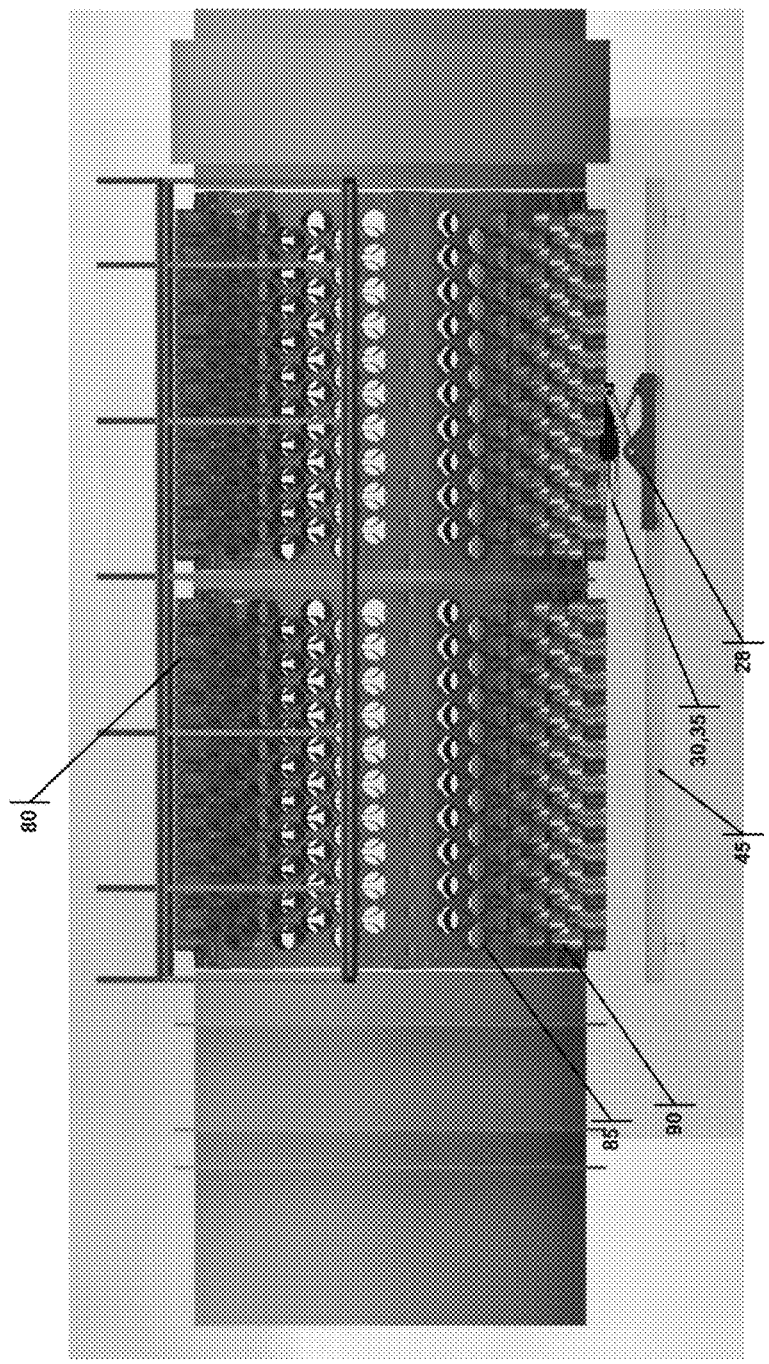
FIG. 11 is a front view of a perforated trommel with elevated perforations that can also be cleaned using the robotic arm described herein.
Figure 12:
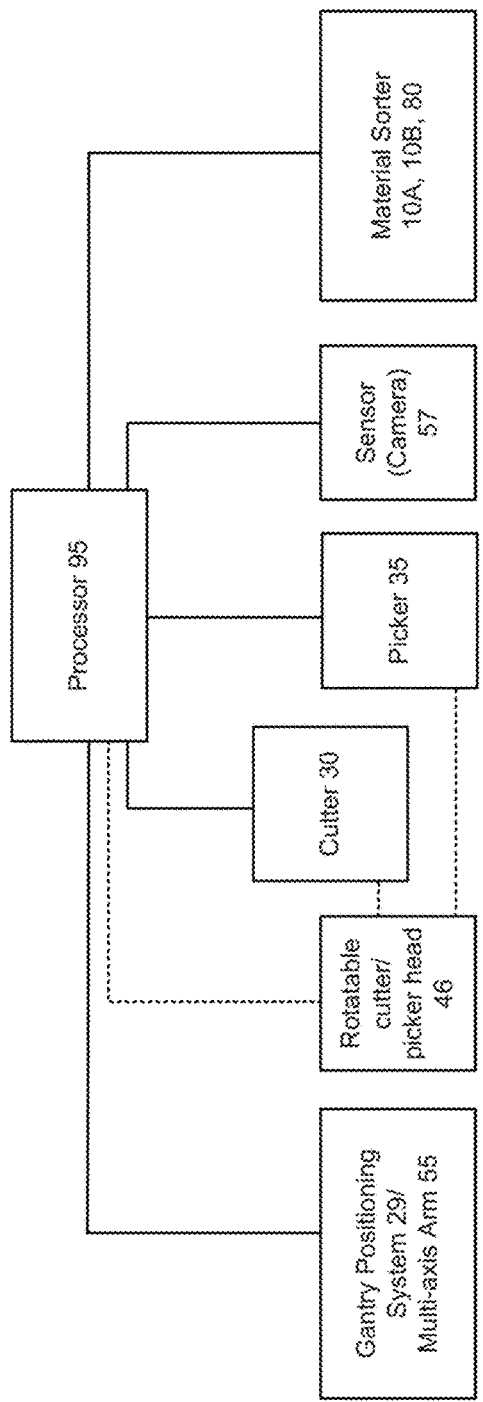
FIG. 12 is a schematic of the processor control system.

A trommel, as used to screen or separate materials, is a perforated cylindrical drum that is elevated at an angle at the feed end, so that physical size separation is achieved by differences in the size of perforations along the rotating drum, with the oversized material exiting the other end. A perforated trommel 80 can be considered a type of material screen, though not a disc screen. FIG. 11 illustrates the use of the robot cutter 28 of the present invention to clean a perforated trommel 80. The perforated trommel 80 is comprised of a plurality of holes 85, with the size of the hole 85 generally being smaller nearer the elevated perforations 90 (feed end) and being larger nearer the exit end of the perforated trommel 80. Alternatively, the hole size may be constant. Each hole 85 may be plugged by stringy or wedge-shaped material, so that periodic maintenance and cleaning is still required for a perforated trommel 80, like the disc screen. The robot cutter 28 of the present invention may have a longitudinal travel rail 45 and a multi-axis arm that may feature a rotatable cutter/picker head 46 that can switch between having the cutter 30 operable (FIG. 8A) and having the picker 35 operable (FIG. 8C). Likewise, the systems described herein may be used in other locations of the sorting apparatus, including the feeder drum system, FIG. 12 shows a schematic for the processor control system that could be used to operate the robotic arm of the present invention to clean the material sorter system. The processor 95 may include a programmable memory, and can read input from the sensor or camera 57 to detect the presence and the location where material has wrapped or jammed on the screen of the material sorter. The screen may refer to either the disc type screen 10-A and 10-B or the perforated trommel 80 screen or other rotating devices such as a feeder/dosing drum. The processor 95 may send output signals to read the sensor and/or position the camera 57. The processor 95, in conjunction with sensors from the gantry positioning system 29 and/or the multi-axis arm 55, may position and actuate the cutter 30 as well as position and actuate the picker 35. Alternatively, if the system makes use of a rotatable cutter/picker head 46, the processor 95 actuates the rotatable cutter/picker head 46 and uses either the gantry positioning system 29 or the multi-axis arm 55 to position the rotatable cutter/picker head 46 before actuating the cutter 30 and/or the picker 35. In such a case, the processor 95 would actuate the rotation of the rotatable cutter/picker head 46 so that it switches between the cutter operable and picker operable states to clean the screen.

Figure 13:
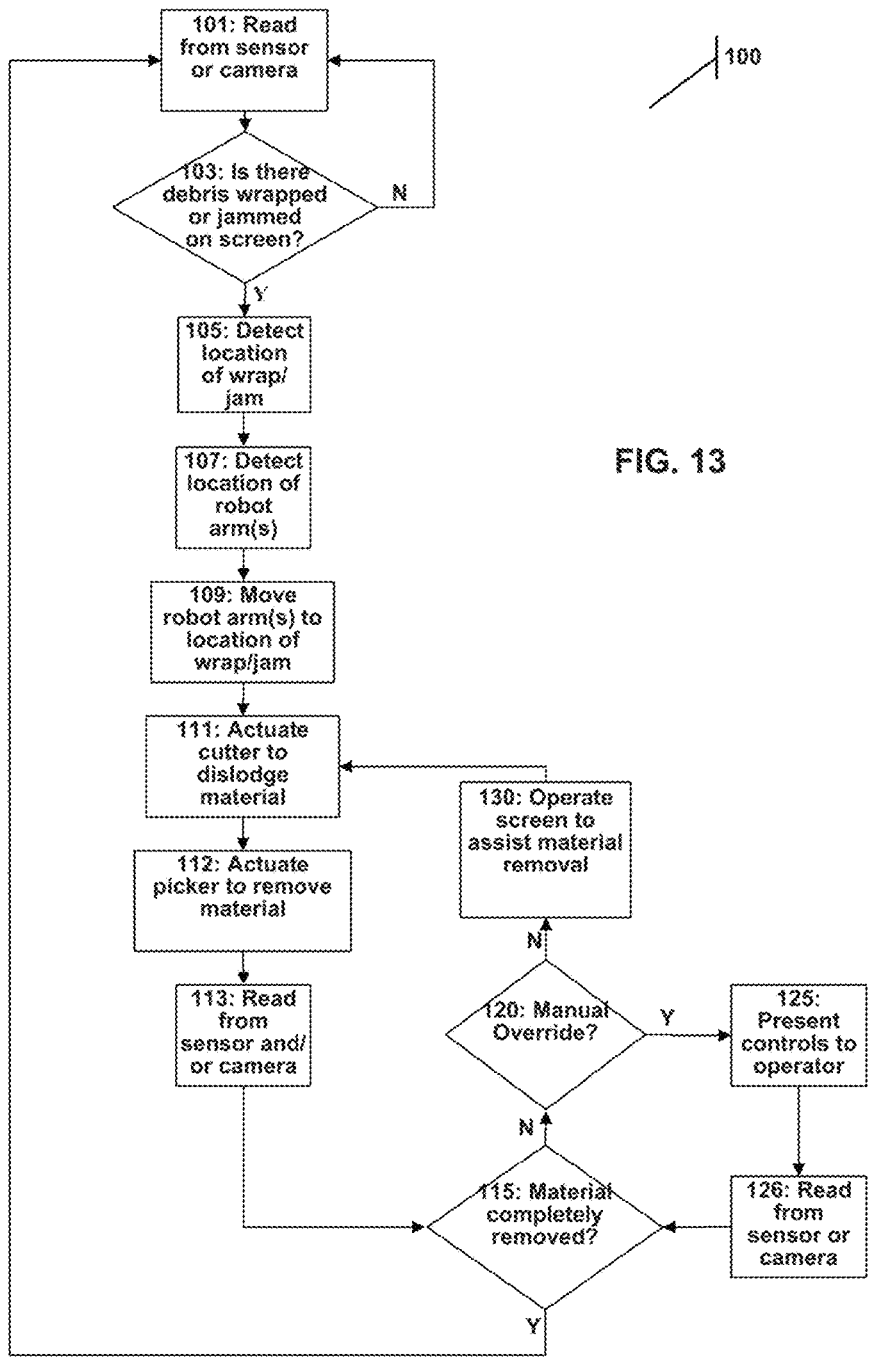
FIG. 13 is a flow chart of the method implemented by the processor control system to operate the robotic arm to self-clean the material sorter system.

The method 100 for operating the material sorter system to self-clean is laid out in FIG. 13, to be performed by the processor 95 or some form of equivalent programmable logic unit. Some of the steps in the method may be optional. First, the system reads in information from a sensor and/or camera (step 101). The word "sensor" may refer to a network of sensors or a system of sensors, with each sensor detecting a jam or wrapped material in one part of the disc screen or the trommel screen. The sensor may detect the wrap or jam via electromagnetic signals such as infrared light or some other wave. Another method of detection involves using a speed sensor or switch to detect a slow speed of a rotating shaft of the disc screen or the trommel screen. Still another method of detection may monitor the drive system of the sorting apparatus for variations in amperage draw or motor faulting, which indicate wrapping buildup.

A camera takes in photoelectric signals, and may be considered a two-dimensional sensor array. Image processing may be used to extract information from images taken with the camera to detect a wrap or jam. After reading in information from a sensor and/or camera in step 101, the system will then determine whether there is debris wrapped or jammed on the screen in step 103, where "screen" may refer to either a disc screen (10-A, 10-B) or a trommel screen (80). If there is currently no wrap or jam, the system returns to step 101 and loops between 101 and 103.

Once it has been ascertained that there is material wrapped or jammed on the screen, the system determines the specific location of the site of the wrap or jam (step 105). There may be a step 107, where the system detects the location of the cutter and/or picker, in order to better guide the movement of the robot arm(s) to the site of the wrap or jam (step 109). Once the cutter is in place, the system can actuate the cutter 30 to dislodge the wrapped or jammed material (step 111). Then, the system can actuate the picker 35 to pick up and remove the wrapped or jammed material in step 112.

As an option, after performing steps 111 and 112 the system can read input from sensor(s) and/or cameras in a step 113. If it then detects that the material was indeed removed from the material sorting machine screen, the system returns to step 101 and may loop until it detects another site of debris wrapping or jamming on the screen (step 102). If, however, it is determined in step 113 that the material was not completely removed, the system could proceed to either step 120 or 130.

If the material was not completely removed by step 115, the system may progress to step 130. In step 130, the system may operate the screen to move either forwards or reverse to assist the robot arms in further dislodging or removing the materials. For a disc screen, this involves operation of the disc screen motor 22. For a perforated trommel 80, this involves operating an actuator motor to rotate the trommel 80 either clockwise or counterclockwise. The system may then repeat steps 111-115 to remove material, and return from there to step 101. The system may also proceed to step 120, alerting a human operator and offering a manual override.

In step 120, the system makes a decision as to whether there should be a manual override. This decision may be influenced by the number of iterations of steps 111, 112, 113, 115, and/or 130 at the same material site. The decision may be aided by detecting a system setting, or detecting a prompt from a human operator of the system. If there is to be a manual override, then the system will present a set of controls to the human operator (step 125), and continue to monitor the site of material jamming or wrapping on the material sorter. When it detects that the material has been completely removed (step 115), it can stop the manual override and return to step 101 to look for another wrap or jam.

While the above will produce a fast, non-fouling cleaning system, there is still limited time to do the cleaning. As such, a prioritization method must be established. The sensor system used to create the prioritization system must be able to quickly measure the amount of wrapping on each hub/rotor. However, this process is complicated because disc screens are typically around 10 feet wide and there is limited room above most disc screens available to place the sensor. While wide angle systems exist, a stationary wide angle sensor system will have significant portions of the disc screen, including those areas where wrapping can occur, occluded by adjacent discs. The larger the lateral distance from the sensor, the larger the occlusion. In general, the height of a disc on a disc screen is going to be proportional to the opening size, so this problem will occur regardless of disc screen design. Therefore, the camera system must be able to move, either as part of the robotic positioning system or independently. Even the addition of multiple volumetric sensors, such as a LIDAR system, within the area will not be sufficient to fully sense the area. As the sensor moves, several advanced sensor such as LIDAR systems and NIR scanners are more difficult to integrate within the system. Further, LIDAR or other volumetric scanning systems have difficulty distinguishing between the mechanisms of the disc screen and wrappings on the disc screen which need to be cleaned and removed. Instead a camera and computer vision software, such as that provided by Cognex Corporation of Natick, Mass., is usable. While the camera and computer vision software is capable of identifying all necessary components, such as discs, open space, wrappings, and the visual encoding features, there are several challenges to implementation of machine vision within this context.

First, such camera and computer vision systems typically will work against a consistent background for the elimination of visual noise. This means that the sensor system should be positioned in relatively the same position each time when inspecting a disc screen for wrapping, requiring movement of the sensor to the correct position before the wrapping inspection begins. Further, the background of a material separation is not typically controllable due to the nature of the facility. Even when a consistent background is present, such as a flat, black rubber conveyor belt being directly under a disc screen, the belt tends to build up with non-black coloring, especially if an item such as a half full paint can enters the sorting facility. Under inclined rubber disc screens the background will tend to be the belly pan of the disc screen. In addition to the variations in color, material such as grit and shredded paper tends to adhere to the belly pan, slowly accumulating and changing the shape and depth of the background. This makes the background in a state of constant change. Further, the area under and around all disc screens tends to be poorly lit, and poor, variable lighting makes computer vision system implementation even more difficult. There are several ways to solve this and allow for the implementation of computer vision systems. A first option is to add a device that extends between the surface of the disc screen and whatever background surface. For example, a tarp on cables could be added to a disc screen underneath the disc screen deck. Under normal operations this device would be retracted to prevent accumulation on it and allow the belly pan of the machine to behave as normal. Under cleaning operations, the tarp could be extended over the background to provide a homogeneous back reference. While this solves the variability issue, and the tarp can be made a bright color for contrast, any track or cable systems have a tendency to foul in this environment due to accumulation of dirt, grit, and fluids, making the tarp itself a maintenance intensive option. Another option for control of background environment in order to aid computer vision is to flood the belly pan area with light (see light 31 in FIGS. 2 and 7). While this doesn't control for background variation, it increases the total amount of signal received by the camera system and thus improves the signal to noise ratio. Further, the prioritization algorithm can be set to look for total luminance in each opening in the disc screen rather than looking specifically for wrapping. While this luminance figure is not exact, and will vary depending on the condition of the belly pan and the configuration of the light sources, it serves as a good approximation of the areas of the disc screen which need cleaning. This is because, as wrapping accumulate on a certain area of a screen, the openings around that area tend to get smaller as they are obstructed by the wrapping material. The more wrapping material, the smaller the opening gets, and the smaller the opening gets, the less total light will be allowed through the opening. Further, the machine can be calibrated such that the amount of light allowed through each opening when the disc screen is clean is set as the maximum value, and the ratio of the current value to the maximum value is used to determine the cleaning order of priority.

Figure 14:
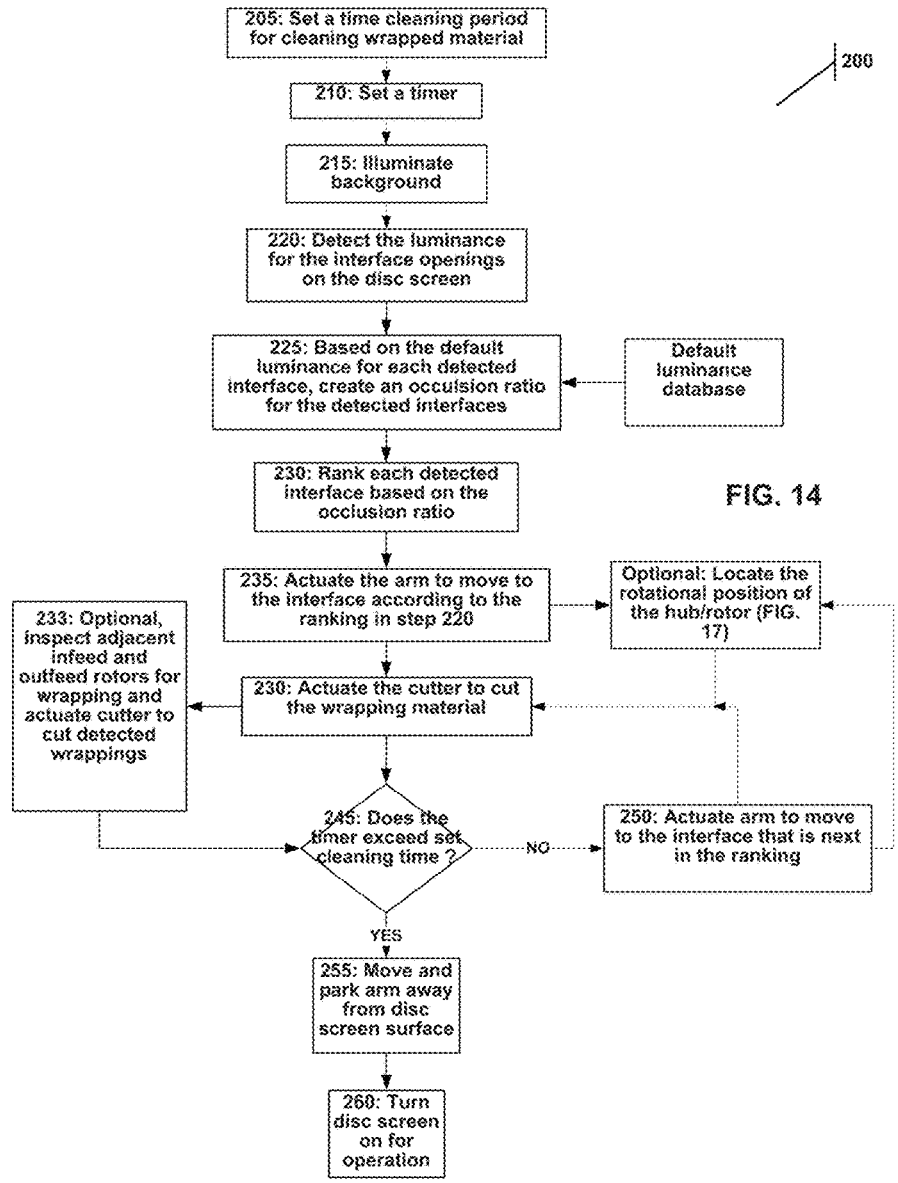
FIG. 14 is a flow chart of a method to prioritize which interfaces should be cleaned.
Figure 15B:
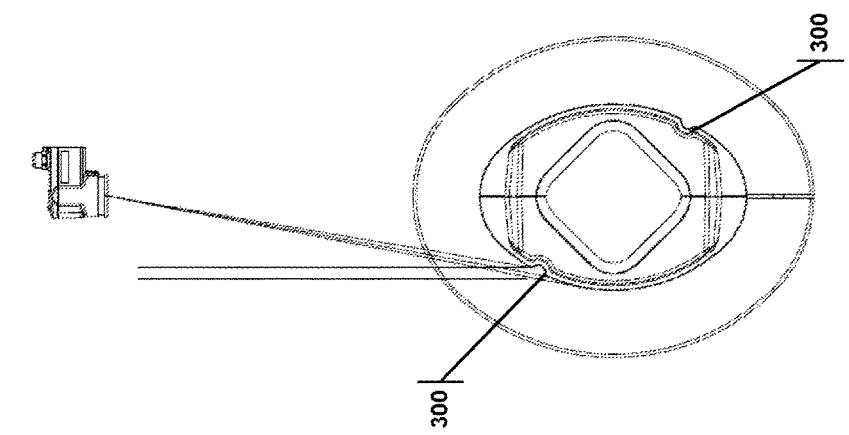
FIG. 15B is a cross-sectional view of a hub/rotor with a rotational detection feature (divot).
Figure 15A:
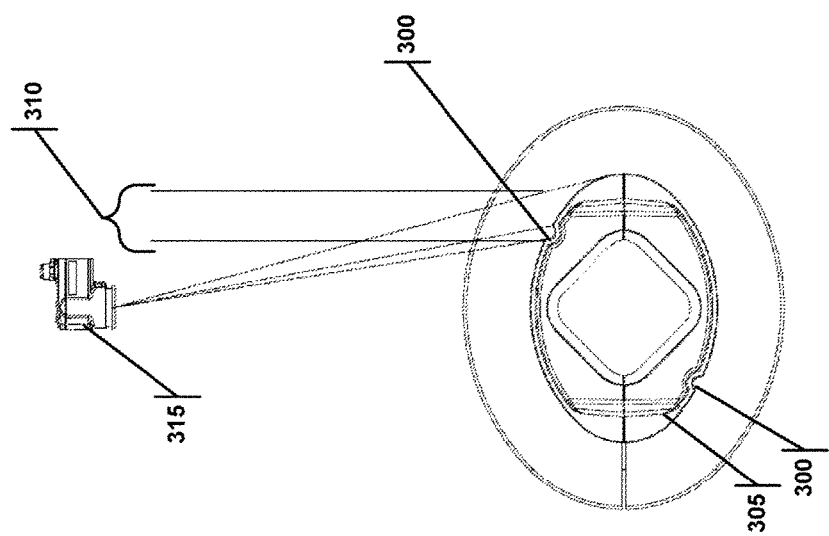
FIG. 15A is a cross-sectional view of a hub/rotor with a rotational detection feature (divot).

An algorithm for cleaning a disc screen by robot system could further include the method 200 shown in FIG. 14. Once the disc screen sorter is in a system stop state, set a time cleaning period at step 205, and then set a timer at step 210 to determine if the cleaning period has been exceeded (see step 245). Illuminate the background (belly pan) at step 215 to assist in determining the relative amount if wrapping in each interface opening in the screen. At step 220, detect the luminance of the interfaces (i.e., the openings between adjacent hubs/rotors/discs). Because the cleaning time is limited, the cutting of wrapping materials must be prioritized. Based on the default stored luminance, the method can create an occlusion ratio at step 225. So for example, if a specific interface has a default luminance of 500 lumens (i.e., an unoccluded reading), but is only detected to have 100 lumens, then an occlusion ratio or measure of 500:100 or 5 may be assigned to this interface. These ratios are ranked at step 230 and the system directs the cutter to move the interfaces according to the rankings (step 235), optimally the most occluded first. The wrapping/occlusions are cut, and the cutter is moved to the next interface on the ranking, provided time permits (steps 245 and 250). Once the preset cleaning time is reached, the cutter is moved away from the disc screen surface so as to not interfere with the disc screens sorting operation (step 255) and the disc screen can then be turned on for operation (step 260). The arm, for example, may be fully retracted and parked at the longitudinal rail extended portion 97, as shown in FIG. 10C. Because wrapping/occlusion often affect adjacent hub/rotors, it may be advantageous to inspect both the infeed hub/rotor and outfeed hub/rotors adjacent to the obstructed interface and cut the material if necessary (step 233).

Ideally, this system is designed to work within the break schedule of the shift employees at the sorting facility as the cleaning actions must take place while the sorting equipment is idle. This is approximately one hour per shift available as time to clean. As a cleaning system usually takes about a minute to move the cutter to the appropriate location and cut, this allows approximately 60 such cleaning operations per shift. This limited timing highlights why it is important to optimize cutting speed and to prioritize cleaning operations to those areas that most require it.

Because wrapping materials are naturally stringy and have a tendency to wrap, any contact based cutter that uses rotational or reciprocal motion must take care in the manner of cutting so as not to damage itself. This significantly reduces cutting speed. Non-contact cutters, including laser cutters and waterjet cutters, are by nature significantly faster at cutting wrapped material in this environment. In many cases the waterjet cutter can work without the addition of an abrasive material due the nature of the material being cut. In addition, the waterjet cutter does not produce heat which makes it preferable in a flammable environment. However, any non-contact cutting system must be positioned with care so that it does not cut into the hub/rotors, discs or trommel of the actual machine and thus cause damage to the machine. Establishing an exact position of each hub/rotor or trommel in a dirty, noisy, dynamic environment is therefore advantageous when using a non-contact cutting system.

But establishing the exact position of each hub/rotor is difficult for at least two reasons. First, hub/rotors and drive components of these systems, such as drive chains, tend not to be precise such that the rotational position of one hub/rotor indicates the rotational position of another. Even when timing belts are used, timing belts jumping one or two teeth is a common occurrence and machines are designed to continue to operate in this condition. Therefore, each hub/rotor must be assessed for rotational position individually. Second, the traditional methods of measuring rotational position, including encoders, are not feasible in this environment as they will tend to be damaged by the material being sorted or the system will require too many of said encoders as it requires one for each disc/rotor, making wiring prohibitively expensive.

Therefore, a preferred way to establish rotational positions of hub/rotors is to place distinguishing rotational detection features at consistent radial positions axially along the disc or hub/rotor. While such features will be covered by wrapping, thus obscuring them and making the visual encoding of the rotational position impossible, discs and hub/rotors tend to be consistent across their long axis due to the rotational strength of structural steel members. This means that while hub/rotors cannot be compared with each other, the rotational position of one part of a hub/rotor (and discs mounted thereon) will be the same rotational position as another part of the same hub/rotor. As wrapping tends to occur far less often at the extreme sides of hub/rotors, distinguishing features placed in these locations will often remain unobscured and thus the rotational position of the hub/rotor can be detected be visual encoding of said features. One such example is show in FIGS. 15A and 15B, where the feature is a divot 300 in the hub/rotor 305. As the hub/rotor 305 is rotated the distance 310 detected by the camera/sensor 315 changes. Based on this distance 310, the system can determine the rotational position of the hub/rotor 305. The camera/sensor 315 may be the same camera/sensor that detects the wrapping material. The same reinforcement structures may be used on the trommel, such that cutting accumulated material is done at substantially the reinforcement structure so as to not damage the trommel.

Establishing the rotational position of a hub/rotor is important because a non-contact cutting system, which operates faster than a contact cutter, needs to either cut at the tangent of the rotor, thus avoiding the hub/rotor all together and not damaging it, or cut over the hub/rotor at a reinforced location on the rotor. This reinforced location can also be a distinguishing feature useful for visual encoding. It is also useful to have this cutting location raised or lowered into the hub/rotor surface for aid in both identification and cutting of materials. If the surface is to be raised, this can be accomplished by welding a piece of abrasion resistant steel square stock the length of the hub/rotor. A reinforced valley made of cold formable abrasion resistant alloy or an extruded material such as silicon carbide can be molded into discs or spacers. Because all these materials can resist cutting by media-less waterjet cutting but not necessarily resist laser cutting this feature is another reason to prefer waterjet based cutters. FIG. 16 illustrates a reinforcement structure 330 that also acts like a rotational detection feature 300. At this position the waterjet cutter 96 may cut the wrapping material without damaging the hub/rotor.

Figure 17:
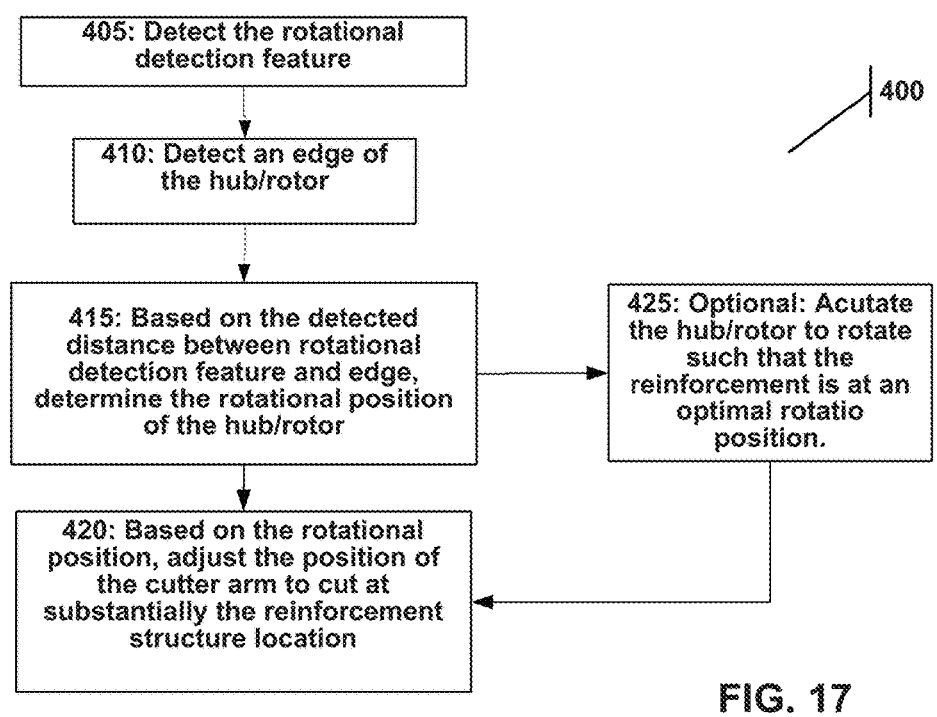
FIG. 17 is a flow chart of a method to determine the rotational position of a hub/rotor.

For tangential cutting, it is easiest to use round hub/rotors as the tangent point does not change position. However, round hub/rotors tend to wrap the most of any hub/rotor shape and are not preferred. Further, modern disc shapes are not round and thus a rotational position would still need to be determined for the cleaning of discs. FIG. 17 illustrates a method 400 that may be used with the method 200 shown in FIG. 14. Once the system has determined which interfaces are occluded and need to be cut, the system may advantageous determine the rotational position of the hub/rotor prior to cutting. The camera/sensor may detect the rotational detection feature on the hub/rotor and the edge of the hub rotor (steps 405 and 410). Based on the distance between the detection feature and the edge, the system can determine the rotational position of the hub rotor (step 415). Optionally, at step 425 the system may actuate the rotation of the hub/rotor based on the calculated rotational position such that the reinforcement is at an optimally cutting position. For example, it may be advantageous to have the reinforcement on the topside (i.e., the 12:00 position) of the hub/rotor. The method then adjusts the position of the cutter to cut at substantially the reinforcement structure location (step 420), or at a tangential position.

Aligning the sorting apparatus such that cutting may be done at a reinforcement structure can also be implemented for a trommel. The reinforcement structure may extend the entire length of the trommel on its interior surface. Determining the rotational position of the trommel and thus the reinforcement structure can be done by inspecting interior surface to located the reinforcement structure or by some other rotational detection feature that may be on the interior or exterior surface of the trommel. It is also possible to check the current position of the trommel drive system which absent slop would, give the rotational position of the trommel. But in practice, trommels much like disc screen have drive slop that makes this indirect rotational detection less accurate.

The invention has been described in connection with specific embodiments that illustrate examples of the invention but do not limit its scope. Various example systems have been shown and described having various aspects and elements. Unless indicated otherwise, any feature, aspect or element of any of these systems may be removed from, added to, combined with or modified by any other feature, aspect or element of any of the systems. As will be apparent to persons skilled in the art, modifications and adaptations to the above-described systems and methods can be made without departing from the spirit and scope of the invention, which is defined only by the following claims. Moreover, the applicant expressly does not intend that the following claims "and the embodiments in the specification to be strictly coextensive." *Phillips* v. *AHW Corp.*, 415 F.3d 1303, 1323 (Fed. Cir. 2005) (en banc).

The invention claimed is:

1. A self-cleaning apparatus for sorting a mixture of materials, the apparatus comprising:
   a material sorter for sorting material, wherein the material enters the sorter and travels along the sorter in a travel direction, the material sorter comprises a rotational detection feature that further comprises a reinforcement structure;
   a gantry positioning system elevated above the material sorter, the gantry positioning system comprising:
      a longitudinal travel rail running along the travel direction, with a longitudinal travel rail carriage;
      a traverse travel rail connected to the longitudinal travel rail carriage running perpendicular to tire longitudinal travel rail, with a traverse travel rail carriage;
      a vertical travel rail connected to the vertical travel rail carriage running perpendicular to the traverse travel rail;
   a cutter connected to the vertical travel rail;
   a sensor for detecting a location where material has accumulated on the material sorter;
   wherein the gantry positioning system is constructed to move the cutter in one or more of the following directions:
      parallel to the direction of the longitudinal travel rail;
      parallel to the direction of the traverse travel rail;
      parallel to the direction of the traverse travel rail;
   a processor connected to the sensor, the gantry positioning system, and the cutter, wherein the processor performs the following steps:
      locating the location where material has accumulated on the material sorter;
      detecting the rotational detection feature with the sensor;
      determining the rotational position of the material sorter based on the location of the feature;
      directing the gantry positioning of system to position the cutter adjacent to the location;
      directing the gantry position system to position the cutter based on the calculated rotational position so as to cut the accumulation at the reinforcement structure; and
      actuating the cutter to dislodge the accumulation from the material sorter.

2. The apparatus of claim 1, further comprising a picker connected to the vertical travel rail, wherein the gantry positioning system is constructed to move the picker in one or more of the following directions:
   parallel to the direction of the longitudinal travel rail;
   parallel to the direction of the traverse travel rail;
   parallel to the direction of the traverse travel rail.

3. The apparatus of claim 2, wherein the picker comprises a hook, a scissor-type gripper or a vacuum.

4. The apparatus of claim 2, wherein the traverse travel rail further comprises a second traverse travel rail carriage; and the vertical travel rail further comprises a second vertical travel rail connected to the second vertical travel rail carriage running perpendicular to the traverse travel rail; wherein the picker is connected to the second vertical rail.

5. The apparatus of claim 1, wherein the material sorter has a sorting surface, the sensor placed on one side of the sorting surface and a light place on the opposite site of the sorting surface, wherein the location step further includes:
   illuminating the light;

detecting the luminance at a plurality of locations where material has accumulated;

determining an occlusion ratio based on the detected luminance and a default luminance for the plurality of locations; and ranking the plurality of locations based on the ratio.

6. The apparatus of claim 1, wherein the cutter comprises a clipper, saw, waterjet, scissor-like cutter, knife, bolt cutter, air chisel, metal cutting wheel, ultrasonic knife or laser.

7. The apparatus of claim 1, wherein in the material sorter comprises a disc screen or a trommel.

8. The apparatus of claim 1, wherein the cutter comprises a rotatable cutter/picker head, wherein the head is connected to the vertical travel rail, and the cutter and picker are connected to the head.

\* \* \* \* \*